United States Patent
Stone et al.

(10) Patent No.: US 9,845,209 B2
(45) Date of Patent: Dec. 19, 2017

(54) MONITORING VEHICLE RESTRAINTS OVER A CONTINUOUS RANGE OF POSITIONS

(71) Applicants: Bradley J. Stone, Port Washington, WI (US); Jason Senfleben, Hartford, WI (US); Paul J. Maly, Mequon, WI (US)

(72) Inventors: Bradley J. Stone, Port Washington, WI (US); Jason Senfleben, Hartford, WI (US); Paul J. Maly, Mequon, WI (US)

(73) Assignee: Rite Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 15/199,060

(22) Filed: Jun. 30, 2016

(65) Prior Publication Data
US 2016/0311635 A1     Oct. 27, 2016

Related U.S. Application Data

(62) Division of application No. 14/192,581, filed on Feb. 27, 2014, now Pat. No. 9,481,531.

(51) Int. Cl.
  *B65G 69/00*   (2006.01)
(52) U.S. Cl.
  CPC .................. *B65G 69/003* (2013.01)
(58) Field of Classification Search
  CPC ................................... B69G 69/003
  USPC ........................................ 414/401
  See application file for complete search history.

(56) References Cited

U.S. PATENT DOCUMENTS

| | | | |
|---|---|---|---|
| 4,010,571 A | 3/1977 | McGuire et al. | |
| 4,648,781 A | 3/1987 | Sikora | |
| 4,692,755 A * | 9/1987 | Hahn | B65G 69/003 340/687 |
| 4,843,373 A * | 6/1989 | Trickle | B65G 69/003 340/540 |
| 5,168,267 A * | 12/1992 | Trickle | B65G 69/003 14/71.1 |
| 5,297,921 A * | 3/1994 | Springer | B65G 69/003 414/396 |
| 5,453,735 A | 9/1995 | Hahn | |

(Continued)

OTHER PUBLICATIONS

Canadian Patent Office, "Office action" issued in connection with Canadian Patent application No. 2,882,251 dated Mar. 21, 2016, 5 pages.

(Continued)

*Primary Examiner* — Kaitlin Joerger
(74) *Attorney, Agent, or Firm* — Hanley, Flight & Zimmerman, LLC

(57) ABSTRACT

Example vehicle restraint apparatus and methods of operating the same are disclosed herein. An example method includes moving a barrier via a vehicle restraint drive unit relative to a main body proximate the dock between a fully extended position to block the vehicle, a fully retracted position to release the vehicle, and a plurality of intermediate positions between the fully extended position and the fully retracted position; monitoring a status of the barrier as the barrier moves through the plurality of intermediate positions; comparing the status to a reference value; determining that an event has occurred based on the comparison of the status and the reference value; and providing an output in response to determining that the event has occurred.

35 Claims, 13 Drawing Sheets

(56) References Cited

U.S. PATENT DOCUMENTS

| | | | |
|---|---|---|---|
| 5,831,540 A | 11/1998 | Sullivan et al. | |
| 6,106,212 A * | 8/2000 | Hahn | B65G 69/003 414/401 |
| 6,116,839 A * | 9/2000 | Bender | B65G 69/003 414/396 |
| 7,165,486 B2 * | 1/2007 | Alexander | F15B 11/20 414/401 |
| 7,384,229 B2 * | 6/2008 | Gleason | B65G 69/003 414/401 |
| 8,529,183 B2 * | 9/2013 | Ion | B65G 69/003 414/396 |
| 8,547,234 B2 | 10/2013 | Maly et al. | |
| 8,596,949 B2 * | 12/2013 | Harrington | B65G 69/003 414/401 |
| 8,616,826 B2 * | 12/2013 | Cotton | B65G 69/003 414/401 |
| 9,139,384 B2 * | 9/2015 | Brooks, IV | B65G 69/005 |
| 9,272,854 B2 * | 3/2016 | Lessard | B65B 69/28 |
| 9,481,531 B2 * | 11/2016 | Stone | B65G 69/003 |
| 2005/0261786 A1 | 11/2005 | Eager et al. | |
| 2006/0181391 A1 | 8/2006 | McNeill et al. | |
| 2008/0124203 A1 | 5/2008 | McDonald | |
| 2010/0266375 A1 | 10/2010 | Ion | |
| 2010/0269273 A1 | 10/2010 | Proffitt et al. | |
| 2015/0191319 A1 * | 7/2015 | Muhl | F16H 21/26 414/401 |
| 2015/0239686 A1 | 8/2015 | Stone et al. | |
| 2016/0009177 A1 * | 1/2016 | Brooks | B60K 35/00 340/468 |
| 2016/0104364 A1 * | 4/2016 | Brooks | G08B 21/187 340/686.1 |

OTHER PUBLICATIONS

United States Patent and Trademark Office, "Notice of Allowance", issued in connection with U.S. Appl. No. 14/192,581, dated Jun. 22, 2016, 16 pages.

United States Patent and Trademark Office, "Non-Final Office action", issued in connection with U.S. Appl. No.14/192,581, dated Apr. 18, 2016, 21 pages.

United States Patent and Trademark Office, "Restriction Requirement", issued in connection with U.S. Appl. No. 14/192,581, dated Jan. 13, 2016, 8 pages.

Canadian Intellectual Property Office, "Examiner's Report," issued in connection with Canadian Patent Application No. 2,882,251, dated Feb. 6, 2017, 3 pages.

United States Patent and Trademark Office, "Notice of Allowance," issued in connection with U.S. Appl. No. 15/271,982, dated Apr. 20, 2017, 21 pages.

* cited by examiner

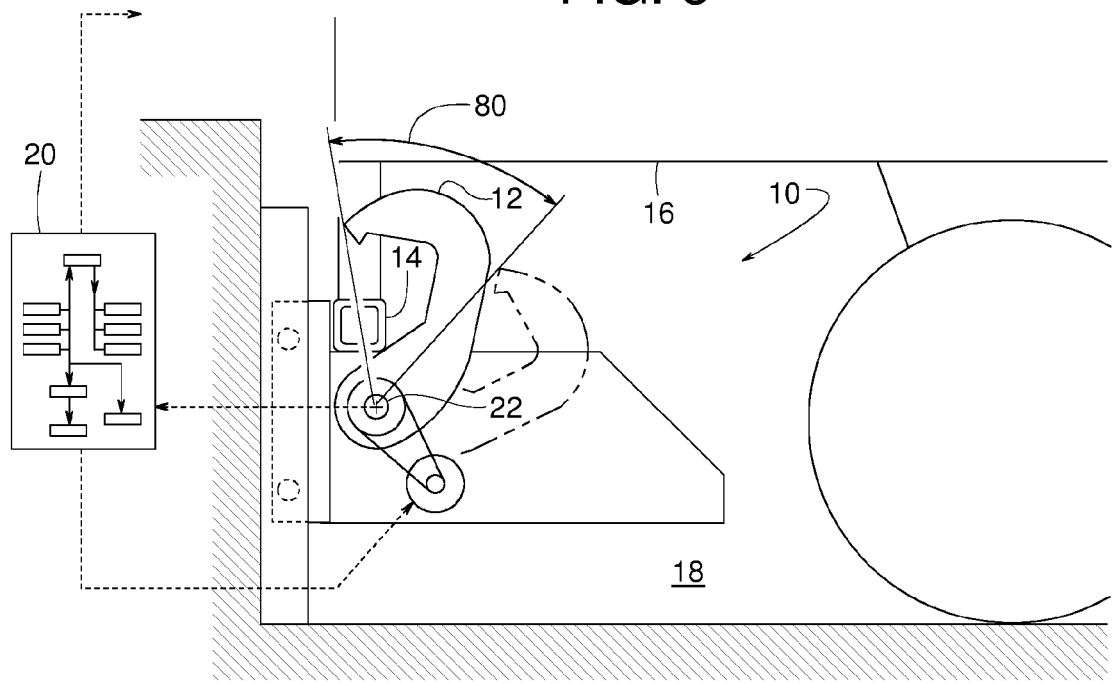
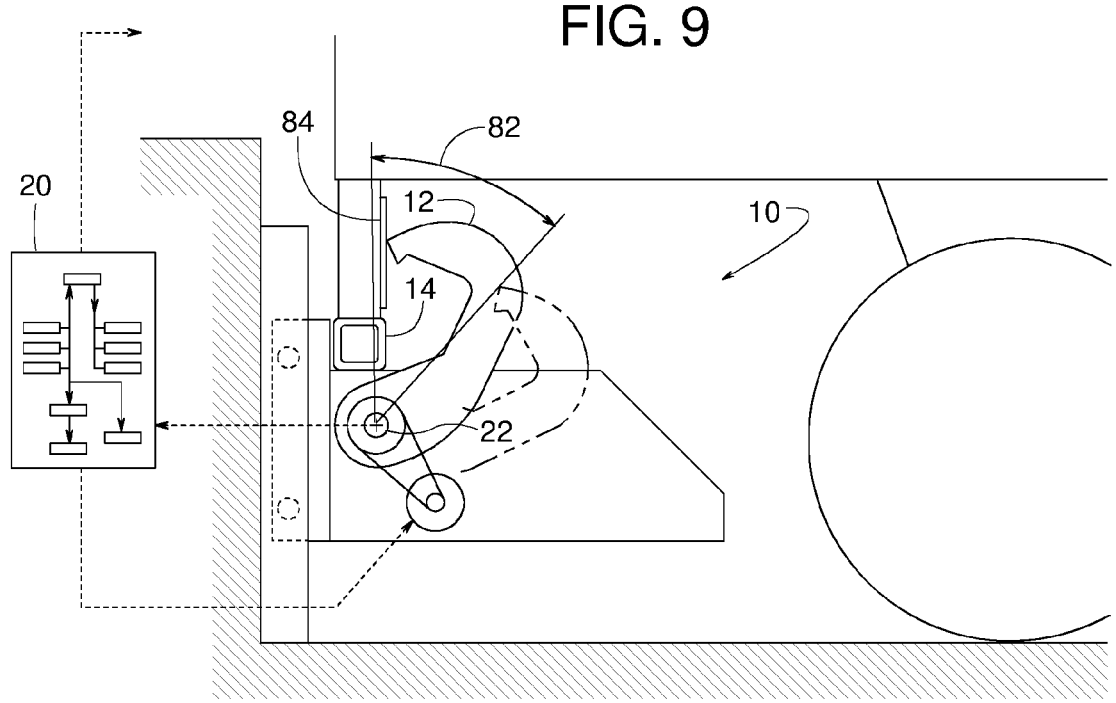

MONITORING VEHICLE RESTRAINTS OVER A CONTINUOUS RANGE OF POSITIONS

FIELD OF THE DISCLOSURE

This patent arises from a divisional of U.S. patent application Ser. No. 14/192,581, filed on Feb. 27, 2014, entitled Monitoring Vehicle Restraints Over A Continuous Range of Positions, which is hereby incorporated herein by reference in its entirety.

FIELD OF THE DISCLOSURE

The present disclosure relates generally to, vehicle restraints for loading docks and, more specifically, to monitoring vehicle restraints over a continuous range of positions.

BACKGROUND

When loading or unloading a vehicle (e.g., a truck, trailer, etc.) parked at a loading dock, it is generally a safe practice to help restrain the vehicle from accidentally moving too far away from the dock. This is often accomplished by a hook-style vehicle restraint that engages what is often referred to in the industry as a vehicle's ICC bar (Interstate Commerce Commission bar) or RIG (Rear Impact Guard). An ICC bar or RIG comprises a bar or beam that extends horizontally across the rear of a vehicle, below the bed of the truck or trailer. Its primary purpose is to help prevent an automobile from under-riding the vehicle in a rear-end collision. A RIG, however, also provides a convenient structure for a hook-style restraint to reach up in front of the bar to obstruct the bar's movement away from the dock.

To release the vehicle and prepare for the next one to enter, the restraint retracts to a lowered position free of the bar. Sometimes, however, forward pressure from the vehicle causes the restraint's hook to catch on the bar in a way that prevents the hook from retracting. Such a condition, if recognized by the driver of the vehicle, is readily remedied by what is known as a "bump-back," where the vehicle momentarily backs up slightly to release the pressure and thus allow the hook to retract.

BRIEF DESCRIPTION OF THE DRAWINGS

FIG. 8 is a schematic side view of the example vehicle restraint shown in FIG. 1 but showing the restraint operating in a first mode to restrain one style of vehicle.

FIG. 9 is a schematic side view of the example vehicle restraint shown in FIG. 1 but showing the restraint operating in a second mode to restrain another style of vehicle.

DETAILED DESCRIPTION

Example vehicle restraints and methods disclosed herein use a sensor to monitor movement of a barrier over a plurality of intermediate positions between an extended position to block a vehicle and a retracted position to release the vehicle. In some examples, a sensor, in combination with a controller, monitors a position, speed, acceleration and/or direction of travel of the barrier. In some examples, the controller, collects and records historical data pertaining to the barrier, decelerates the barrier as the barrier approaches a hard stop, de-energizes a drive unit upon sensing the barrier has stopped moving, provides various maintenance and safety warnings, signals the need for a "trailer bump-back" procedure, provides programmably adjustable set points, and/or is programmably adaptable to different style vehicles.

Figure 1:
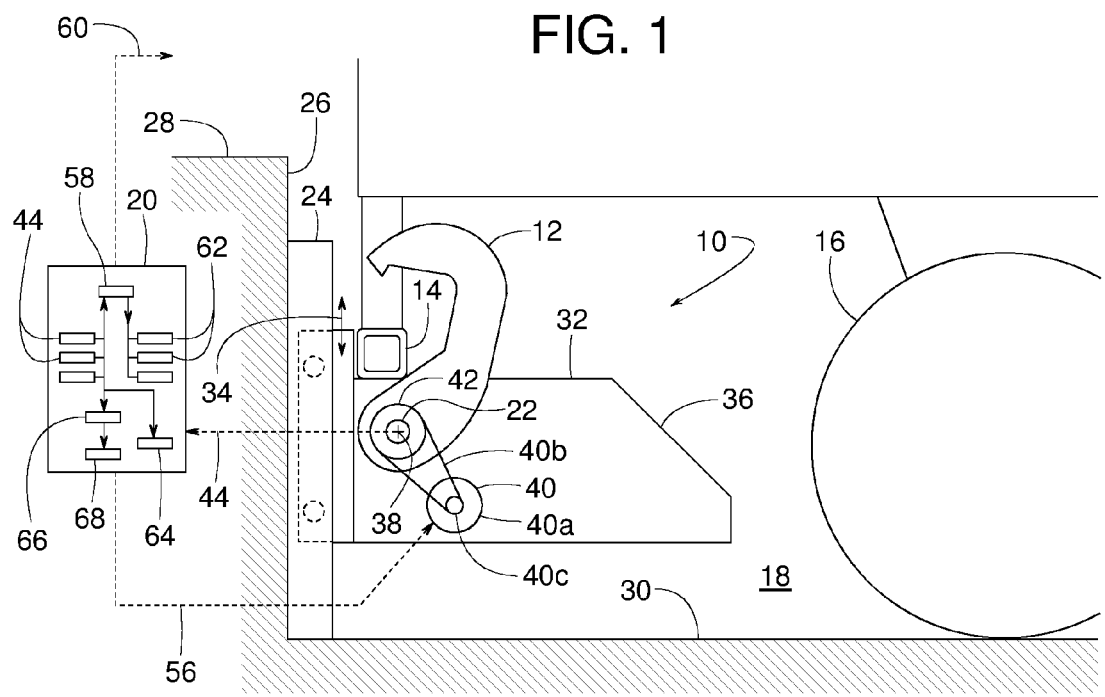
FIG. 1 is a schematic side view of an example vehicle restraint constructed in accordance with the teachings of this disclosure.
Figure 2:
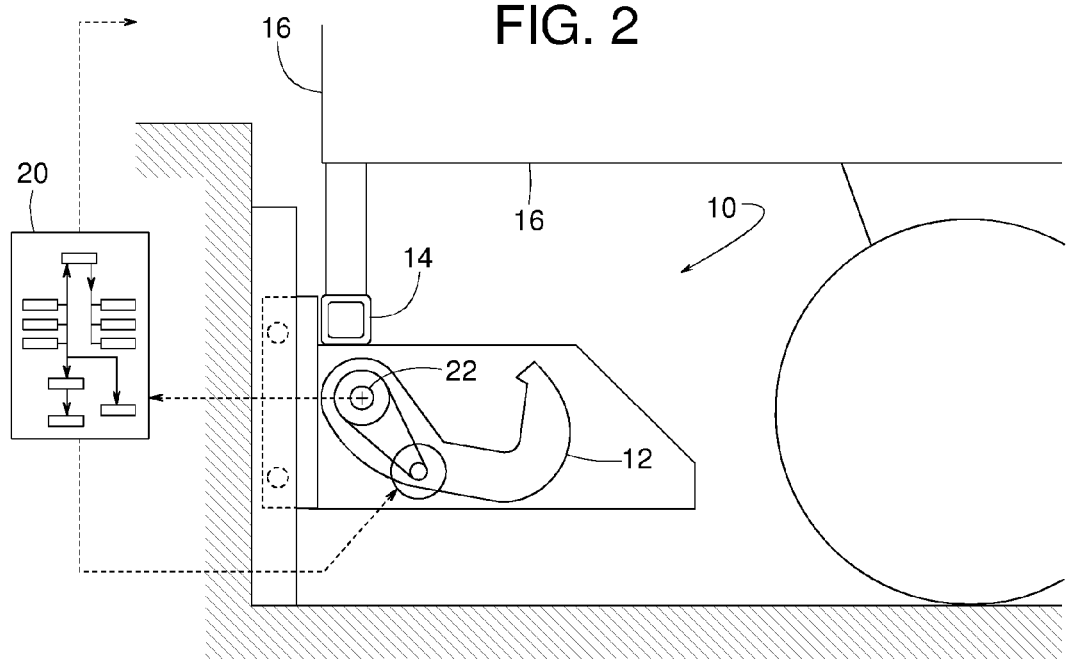
FIG. 2 is a schematic side view of the example vehicle restraint shown in FIG. 1 but showing a barrier of the example vehicle restraint in a fully retracted position.
Figure 10:
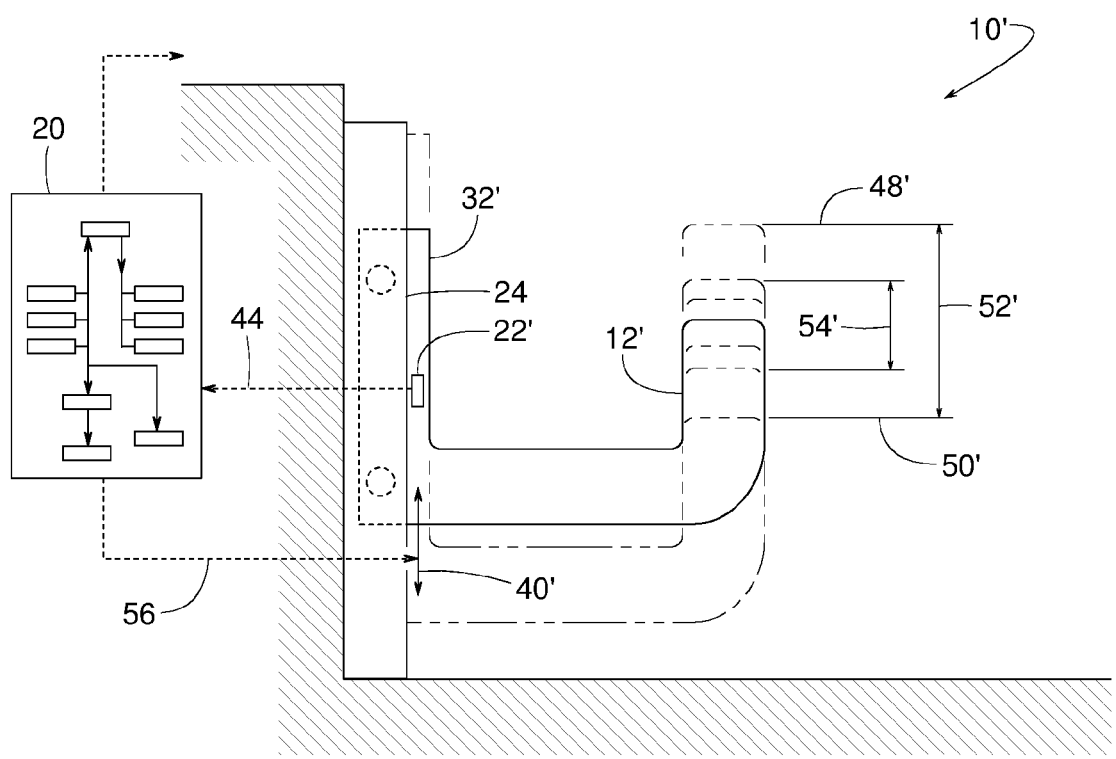
FIG. 10 is a schematic side view of another example vehicle restraint constructed in accordance with the teachings disclosed herein.

FIGS. 1-9 show an example vehicle restraint 10 having a barrier 12 that is movable between an extended position (e.g., a fully extended or upper most position such as the position shown, for example, in FIG. 1) and a retracted position (e.g., a fully retracted or lower most position such as the position shown, for example, in FIG. 2) to selectively block and release a rear impact guard 14 of a vehicle 16 (e.g., truck, trailer, etc.) parked at a loading dock 18. Vehicle restraint 10 includes a controller 20 and an associated sensor 22 to monitor barrier 12 as the barrier moves along an infinite plurality of intermediate positions (e.g., FIG. 3) between the fully extended and fully retracted positions. FIG. 10 shows an alternate example vehicle restraint 10' with a vertically translating barrier 12', and FIGS. 11A, 11B and 11C are three side-by-side adjoining sections of a block diagram illustrating various methods pertaining to vehicle restraints 10 and 10'.

Sampling or monitoring the position of the barrier in a generally continuous manner provides many advantages and opportunities. Some examples of such advantages and opportunities include, but are not limited to, determining barrier speed, recognizing certain fault conditions, decelerating the barrier as it approaches a hard stop, recording and evaluating the vehicle restraint's performance over time, recognizing vehicular movement that displaces the barrier and responding accordingly, de-energizing a drive unit upon sensing the barrier has stopped moving, signaling the vehicle (e.g., to an operator of the vehicle) to "bump back" in order to be released from an over extended barrier, programming different barrier operating ranges for different style or types of vehicles, and using a single sensor to detect the position of the barrier at multiple points.

Referring to FIGS. 1-9, some examples of vehicle restraint 10 include a track 24 mounted to a dock face 26 that extends vertically between a dock platform 28 and a dock driveway 30. In this example, restraint 10 includes a main body 32 that can move along track 24 in a direction indicated by an arrow 34 (e.g., a vertical direction) to accommodate various elevations of rear impact guards and their incidental vertical movement as the vehicle is loaded or unloaded of its cargo. In some examples, a spring urges main body 32 toward a raised position (e.g., a fully raised position) while vehicle 16 backing into dock 18 forces or moves main body 32 down underneath rear impact guard 14 as guard 14 moves back along an inclined edge 36 of the main body 32. In other examples, a hydraulic cylinder, pneumatic cylinder, linear motor, or other known comparable device moves main body 32 up and/or down as needed (e.g., relative to the impact guard 14).

In the illustrated example, barrier 12 is a hook that relative to main body 32 rotates about an axis 38 (e.g., a centerline of a shaft). To rotate barrier 12 between its fully extended and fully retracted positions, some examples of vehicle restraint 10 include a vehicle restraint drive unit 40, which is schematically illustrated to represent any apparatus used to move barrier 12 relative to main body 32. In some examples, vehicle restraint drive unit 40 includes a motor 40a (e.g., electric, pneumatic or hydraulic) with a power transmitting element 40b (e.g., a chain, a V-belt, a cogged belt, meshing gears, sprockets, sheaves, wheels and combinations thereof) that transmits power from an output shaft 40c of the motor 40a to an input member 42 (e.g., sprocket, sheave, etc.) of barrier 12.

Figure 3:
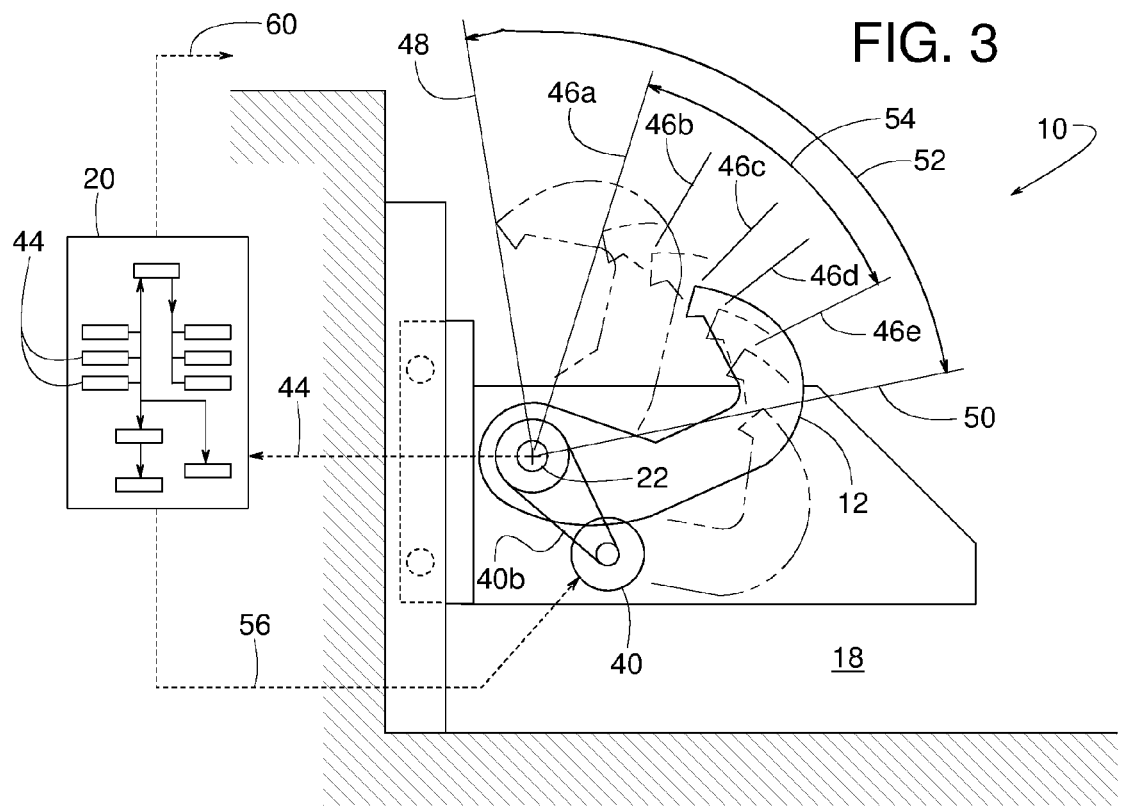
FIG. 3 is a schematic side view of the example vehicle restraint shown in FIG. 1 but showing the barrier in a plurality of intermediate positions.

To monitor the operation of barrier 12, controller 20 receives a plurality of position feedback signals 44 (i.e., a signal of changing values) from sensor 22, which is configured to sense a position of the barrier 12 (e.g., has a sensing relationship with barrier 12). The term, "sensing relationship" as it pertains to a sensor and a barrier means that the sensor is operable or configured to determine a speed of the barrier, a direction of movement of the barrier, and/or a position of the barrier. Feedback signal 44, from sensor 22, indicates a plurality of sensed positions of barrier 12 as the barrier 12 moves along an infinite plurality of intermediate positions. Positions 46a, 46b, 46c, 46d and 46e, as shown in FIG. 3, are a few examples of the infinite plurality of intermediate positions of the barrier 12. In some examples, the plurality of position feedback signals 44 also identifies barrier 12 being at its fully extended position 48 and its fully retracted position 50.

In some examples, the infinite plurality of intermediate positions, monitored by sensor 22, extends completely and continuously from the fully extended position 48 to the fully retracted position 50, inclusive. Thus, in some such examples, the infinite plurality of intermediate positions extends over a full travel range 52 of barrier 12 (see FIG. 3). In some examples, the infinite plurality of intermediate positions, monitored by sensor 22, extends over a partial, limited or truncated range 54 between the barrier's fully extended position 48 and fully retracted position 50.

Sensor 22 is schematically illustrated to represent any device that detects or provides a feedback signal 44 in response to the changing position of barrier 12 over a plurality of intermediate positions between the fully extended and fully retracted positions. In some examples, the sensor 22 is configured to detect a change in position of the barrier 12 when the barrier 12 moves to any position between the extended and retracted positions. Examples of sensor 22 include, but are not limited to, an encoder, a resolver, a linear position transducer, a rotary transducer, a linear potentiometer and a string potentiometer, a video camera with analytics, optical sensor, and/or any other sensor(s). Example locations for installing sensor 22 include, but are not limited to, on or proximate barrier 12, on or proximate drive unit 40, on or proximate power transmitting element 40b and/or any other suitable location.

In examples in which the sensor 22 includes a video camera with analytics, the video camera may be located in any location within a line of sight of the barrier 12. Example video cameras and methods of use that can be used to implement the sensor 22 are described in U.S. patent application Ser. No. 61/772,500, titled "Video Based Jam Detection Methods, which was filed on Mar. 4, 2013 and is hereby incorporated by reference herein in its entirety. In some examples, the video camera captures images of the barrier 12 and compares the images to a stored reference image to determine a position of the barrier, detect a change in position of the barrier 12, determine a speed of the barrier 12 and/or determine other information related to the barrier. In some examples, the video camera captures images of the vehicle 16 and compares the images to a stored reference image to determine a style of the vehicle 16 and/or additional and/or alternative information. In some examples, the video camera analyzes the images in additional and/or alternative ways.

In some examples, the video camera is used to monitor the barrier 12 for security purposes. For example, the video camera may capture images and/or video of the barrier 12 and/or the loading dock 18 when personnel of the loading dock 18 and/or the vehicle 16 are not present such as, for example, during non-business hours. In some examples, the video camera monitors the barrier 12 for security purposes by capturing and recording images and/or video of the barrier 12 and/or the loading dock 18, detecting a presence of an unauthorized person at the loading dock 18, and/or detecting movement of the barrier 12 that is not commanded by the controller 20.

To interpret feedback signal 44, vehicle restraint 10 includes controller 20 to receive feedback signal 44 from sensor 22. The term, "controller" refers to any singular or collection of components to monitor and/or command one or more actions (physical, visual and/or audible) of the vehicle restraint. Examples of a controller include, but are not limited to, a computer, a PLC (programmable logic controller), an electrical circuit, a logic circuit, a processor, a pneumatic circuit, sensors, transducers, and/or various combinations thereof. In some examples, controller 20 is housed within a single enclosure. In some examples, controller 22 includes multiple enclosures. In some examples, controller 22 includes multiple separate components that are interconnected by one or more signal communication links (e.g., hardwired, Bluetooth, wireless, etc.).

In some examples, as shown in FIG. 1, controller 22 includes an output 56 operatively connected to drive unit 40 to control the barrier in response to feedback signal 44 with reference to a stored reference 58. Examples of output 56 include, but are not limited to, a command to move the barrier in a direction toward the retracted or extended positions, a command to stop the barrier, a command to decelerate or accelerate the barrier, etc. In addition or alternatively, controller 20 includes an output 60 to provide various information. Examples of such information include, but are not limited to, an alarm, a fault indicating a problem or a failure state, barrier speed, barrier position, barrier direction of travel, maintenance advisory, bump-back signal, display of chosen vehicle style, etc. Vehicle 16 forcing barrier 12 below a predetermined blocking position 46c (e.g., a minimally acceptable blocking position) is an example of an event that triggers output 60 to provide a signal representative of an alarm or fault indication. The output 60 can be in various forms, examples of which include, but are not limited to, audible, visual, color, text, flashing and/or various combinations thereof On the example of FIG. 1, to process and analyze feedback signal 44, the controller 20 compares the plurality of feedback signals 44 to the stored reference value 58 to generate a plurality of comparisons 62. In some examples, comparisons 62 are generated by controller 20 by calculating a difference between feedback signal 44 and stored reference 58. Examples of stored reference 58 include, but are not limited to, the value of signal 44 when barrier 12 is at the fully extended position 48, the value of signal 44 when barrier 12 is at the fully retracted position 50, the value of signal 44 when barrier 12 is at the minimally acceptable blocking position 46c, the value of signal 44 when barrier 12 is at a position that would likely require a bump-back in order to release bar 14, and the value of signal 44 when barrier 12 is about to reach a certain stopping position, a value representing any one of the plurality of intermediate positions, and/or any other value representative of a characteristic and/or state (e.g., a position, speed, direction, etc.) of the barrier 12.

Based on the plurality of feedback signals 44, some examples of controller 20 derive a calculated speed value 64 of barrier 12. In some examples, controller 20 collects and stores historical data 66 based at least partially on the plurality of position feedback signals 44. Examples of historical data 66 include, but are not limited to, previous positions of barrier 12 and previous calculated speeds of barrier 12. In some examples, controller 20 calculates a derived statistical value 68 of the stored historical data 66. Examples of derived statistical value 68 include, but are not limited to, number of daily operating cycles, average blocking position, average barrier speed, peak speed of barrier, degradation of average barrier speed, average rate of acceleration of the barrier 12, degradation of an average rate of acceleration of the barrier 12, number of fault events, number of operating hours, a calculated value indicating whether the performance of barrier 12 or vehicle restraint 10 has declined to a threshold level of degradation etc. In some examples, the stored reference value 58 is the derived statistical value 68, includes the derived statistical value 68 and/or is based on the stored historical data 66.

Figure 4:
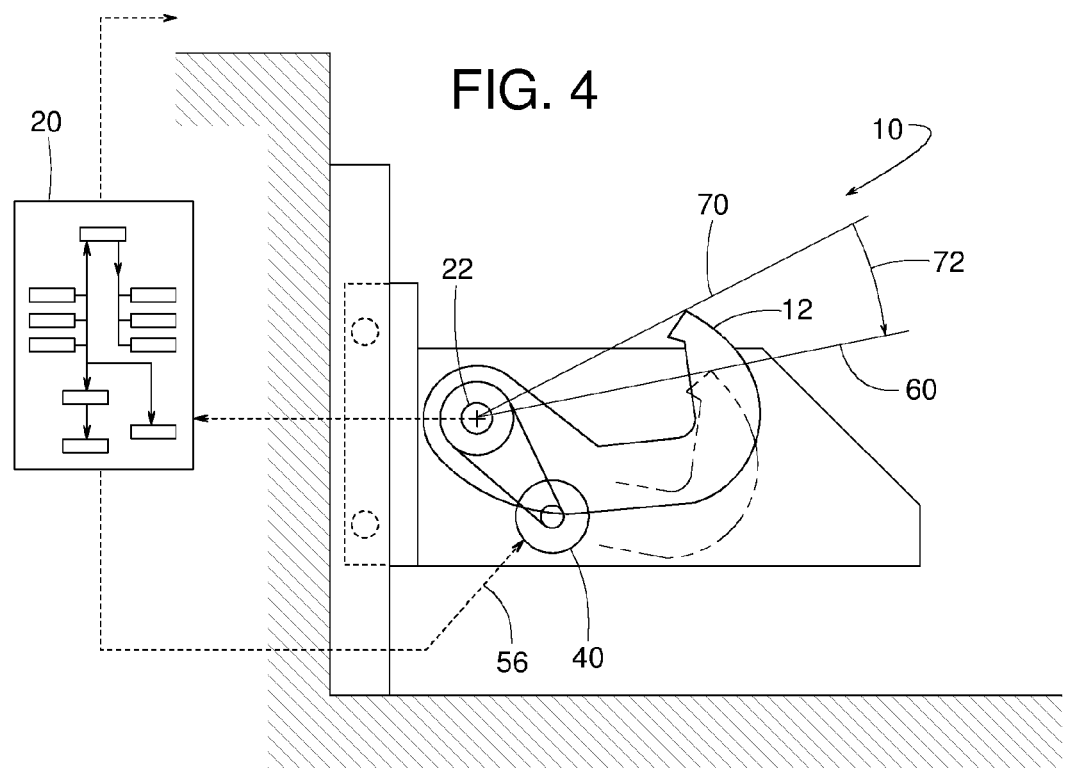
FIG. 4 is a schematic side view of the example vehicle restraint shown in FIG. 1 but showing the barrier within a range of deceleration.

Referring to FIG. 4, in some examples, barrier 12 descending to a threshold position 70 just prior to reaching the fully retracted position 50 triggers controller 20 to provide an output 56 that commands drive unit 40 to decelerate within a certain range 72 as barrier 12 approaches the fully retracted position 50. This prevents barrier 12 from slamming to a hard stop at fully retracted position 50. A similar approach can be used for barrier 12 extending to a threshold upper stop position. In some examples, output 56 deactivates drive unit 40 in response to controller 20 determining that barrier 12 has stopped moving, which can prevent running drive unit 40 unnecessarily and thereby prolong the life of drive unit 40 and/or other components of vehicle restraint 10.

Figure 5:
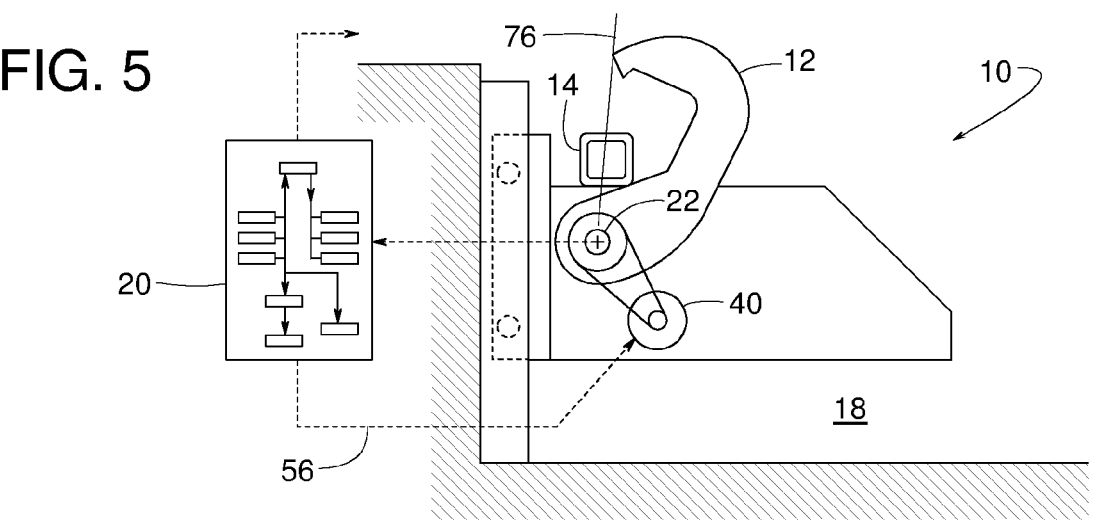
FIG. 5 is a schematic side view of the example vehicle restraint shown in FIG. 1 but showing the barrier in a blocking position.
Figure 6:
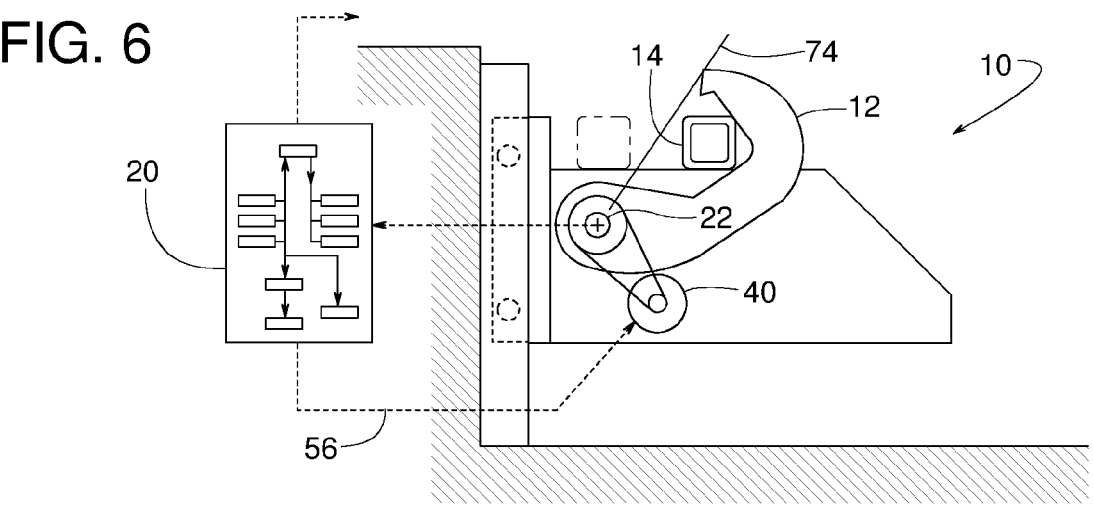
FIG. 6 is a schematic side view of the example vehicle restraint shown in FIG. 1 but showing the barrier in another blocking position.
Figure 6A:
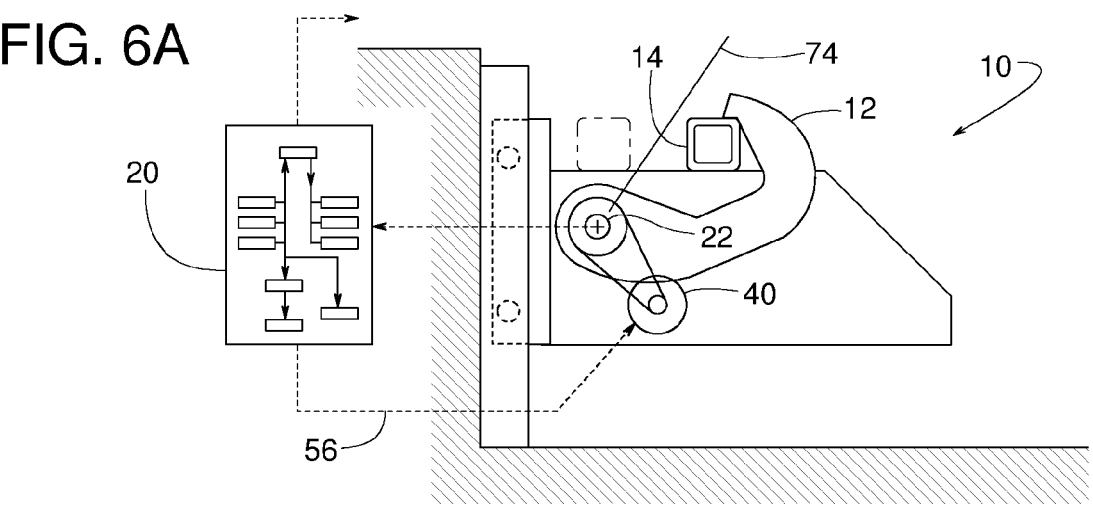
FIG. 6A is a schematic side view of the example vehicle restraint of FIG. 1 but showing the barrier in another blocking position.
Figure 7:
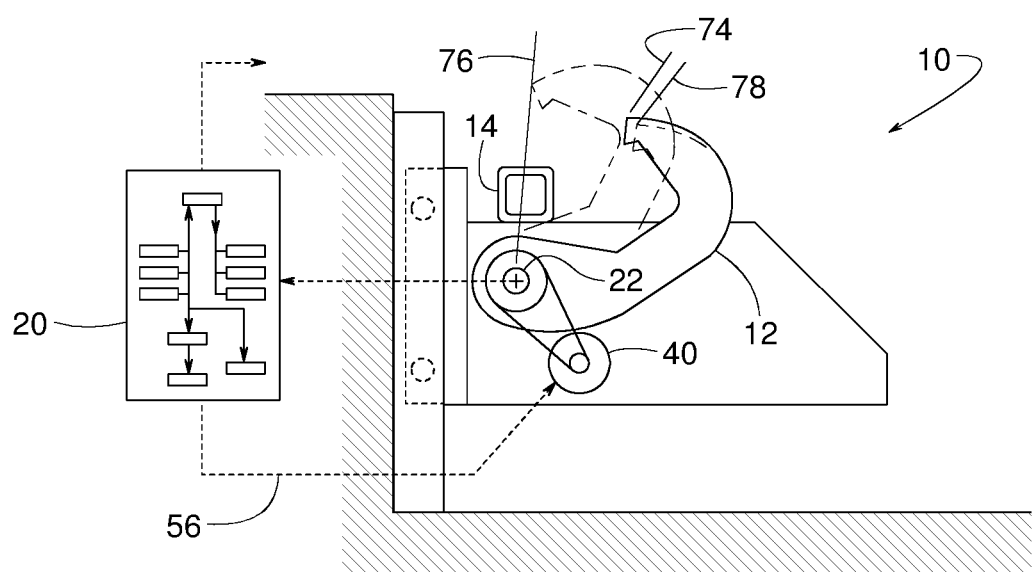
FIG. 7 is a schematic side view of the example vehicle restraint shown in FIG. 1 but showing in phantom lines alternate responses to the barrier's movement.

In some examples, as shown in FIGS. 5-7, output 56 "refires" or activates drive unit 40 to extend barrier 12 after controller 20 determines that the vehicle's bar 14 has forced or caused barrier 12 to retract while drive unit 40 was inactive (e.g., de-energized). For example, FIG. 5 shows drive unit 40 having extended barrier 12 in an extended position 76 to block or obstruct vehicle bar 14, and FIG. 6 shows the vehicle bar 14 having shifted or pulled forward and thereby forcing barrier 12 to retract to a first partially extended position 74. FIG. 6A shows the vehicle bar 14 having shifted or pulled forward and thereby forcing barrier 12 to further retract to a second partially extended position. FIG. 7 shows the vehicle's bar 14 having subsequently returned to extended position 76 shown in FIG. 5. In some examples, following a threshold delay after vehicle bar 14 forced barrier 12 to partially retract, output 56 reactivates or reenergizes drive unit 40 to return barrier 12 to extended position 76.

If the cycle illustrated in FIGS. 5-6A repeats a certain number of times, which can sometimes occur during normal loading and unloading operations, some examples of controller 20 will cause the barrier 12 to move to a slightly more retracted target position 78 and maintain the target position 78 to avoid repeatedly driving barrier 12 back-and-forth between the blocking extended positions 74 and 76 shown in FIGS. 5-6A, respectively. Avoiding the back-and-forth movement of barrier 12 can reduce disconcerting operational noise of vehicle restraint 10 and/or prolong the operating life of the vehicle restraint 10.

In FIG. 6A, a lip or end of the barrier 12 is engaged with the bar 14. As a result, the bar 14 of the vehicle 16 may exert a jamming pressure against the barrier 12 that prevents the barrier 12 from retracting when the controller 20 commands the drive unit 40 to move the barrier 12 toward the fully retracted position. In some such examples, the controller 20 determines that the barrier 12 is in an error state and provides a fault signal. In some such examples, the fault signal is a bump-back signal such as, for example, a light or message indicating that the vehicle 16 should momentarily move toward the dockface 26 to relieve the jamming pressure and permit the barrier 12 to retract, if desired. In some examples, the controller 20 provides the bump-back signal in response to barrier 12 being within a certain range of the fully extended position or the drive unit 40 being unable to move barrier 12 to its fully retracted position. For example, the bump back signal may be a fault signal indicating that the barrier is in an error-state.

Referring to FIGS. 8 and 9, to modify the operation of the vehicle restraint to accommodate different styles of vehicle 16, some examples of controller 20 are user programmable to operate selectively in a first mode (FIG. 8) for some vehicles and in a second mode (FIG. 9) for other vehicles. In some examples, the controller 20 determines if the controller 20 is to operate in the first mode or the second mode based on an input provided by a user. For example, the user may provide an input associated with a first vehicle style or a second vehicle style. In some such examples, if the controller 20 receives the input associated with the first vehicle style, the controller 20 operates in the first mode. If the example controller 20 receives the input associated with the second vehicle style, the controller 20 operates in the second mode.

In some examples, the controller 20 automatically (i.e., without human input) determines if the controller 20 is to operate in the first mode or the second mode based on the position feedback signals provided by the sensor 22. For example, if the controller 20 commands the barrier 12 to move to the fully extended position and the barrier 12 moves to a position over the bar 14 (FIG. 8), the controller 20 determines that the controller 20 is to operate in the first mode. In some examples, if the controller 20 commands the barrier 12 to move to the fully extended position and the barrier 12 contacts a plate 84 (FIG. 9) or other structure of the vehicle 16 that prevents the tip of the barrier 12 from extending over the bar 14, the controller 20 determines that the barrier 12 stopped in a position short of the fully extended position. As a result, the example controller 20 determines that the controller 20 is to operate in the second mode.

In some examples in which the sensor 22 is a video camera with analytics, the controller 20 automatically determines if the controller 20 is to operate in the first mode or the second mode based on one or more images of the vehicle 16 captured by the video camera. For example, the controller 20 may compare the images to one or more stored reference images to determine if the vehicle 16 has the first vehicle style, the second vehicle style and/or one or more other vehicle styles. If the example controller 20 determines that the vehicle 16 has the first vehicle style, the controller 20 operates in the first mode. If the example controller 20 determines that the vehicle 16 has the second vehicle style, the controller 20 operates in the second mode.

For example, in the first mode, controller 20 is programmed to define a first blocking range 80 for vehicles that allow a tip of barrier 12 to extend back over bar 14 as shown, for example, in FIG. 8. For example, controller 20 in the first mode may not be configured to generate a fault signal if barrier 12 blocks bar 14 while the tip of barrier 12 is within the relatively broad blocking range 80. In the second mode, however, the controller 20 of the illustrated example is programmed to define a second allowable blocking range 82 different than the first blocking range 80 for vehicles that have the plate 84 or other structure that prevents the tip of barrier 12 to extend back over bar 14 as shown, for example, in FIG. 9. Controller 20 in the second mode does not generate a fault signal if barrier 12 blocks bar 14 while the tip of barrier 12 is within the more limited blocking range 82 (e.g., blocking range 82 provides a smaller rotational range than the blocking range 80). In some examples, the controller 20 determines the first blocking range, the second blocking range, and/or additional and/or alternative blocking positions and/or blocking ranges based on the images of the vehicle 16.

FIG. 10 shows an alternate example vehicle restraint 10' with barrier 12' and a main body 32' that move together (e.g., vertically) as a unit or unitary structure along track 24. Barrier 12' is movable over a full travel range 52' between an extended position 48' (e.g., a fully extended position) and a retracted position 50' (e.g., a fully retracted position). Barrier 12' is further movable over an infinite plurality of intermediate positions that extend over at least a portion 54' of the full travel range 52'. In some examples, the infinite plurality of intermediate positions, monitored by a sensor 22', extends completely and continuously from the fully extended position 48' to the fully retracted position 50', inclusive. Thus, in some such examples, the infinite plurality of intermediate positions extends over the full travel range 52' of barrier 12'. In some examples, the infinite plurality of intermediate positions, monitored by a sensor 22', extends over a portion, limited or truncated range 54' between the barrier's fully extended position 48' and fully retracted position 50'.

Sensor 22', comparable to sensor 22, is schematically illustrated to represent any device, apparatus or system that provides feedback signal 44 in response to the changing position of barrier 12' over a plurality of intermediate positions between the fully extended and fully retracted positions. Examples of sensor 22' include, but are not limited to, an encoder, a resolver, a linear position transducer, a rotary transducer, a video camera, a linear potentiometer and a string potentiometer, etc. Example locations for installing sensor 22' include, but are not limited to, on or proximate barrier 12', on or proximate main body 32', on or proximate track 24 and/or any other suitable location. In response to feedback signal 44, some examples of controller 20 provide output signal 56 to a vehicle restraint drive unit 40', which is schematically illustrated by arrow 40'. In this example, vehicle restraint drive unit 40' powers (e.g., an upward and/or downward movement of) the barrier 12' and main body 32'. The method of operating vehicle restraint 10' is comparable to that of vehicle restraint 10.

FIGS. 11-16 are flowcharts representative of example machine readable instructions 1100, 1200, 1300, 1400, 1500, 1600 for implementing the example vehicle restraint 10 of FIGS. 1-9 and/or the example vehicle restraint 10' of FIG. 10. The example instructions 1100 of FIG. 11 may be executed by the controller 20 to control movement of the barrier 12. In some examples, the controller 20 controls movement of the barrier 12 based on a position of the barrier 12 and a stored reference. For example, the controller 20 may extend the barrier 12, retract the barrier 12, stop the barrier 12, accelerate the barrier 12, decelerate the barrier 12, move the barrier 12 to a given position, retain the barrier 12 in a given position, and/or otherwise control the movement of the barrier 12 in any other way based on one or more comparisons between a position of the barrier 12 and a stored reference.

Figure 11:
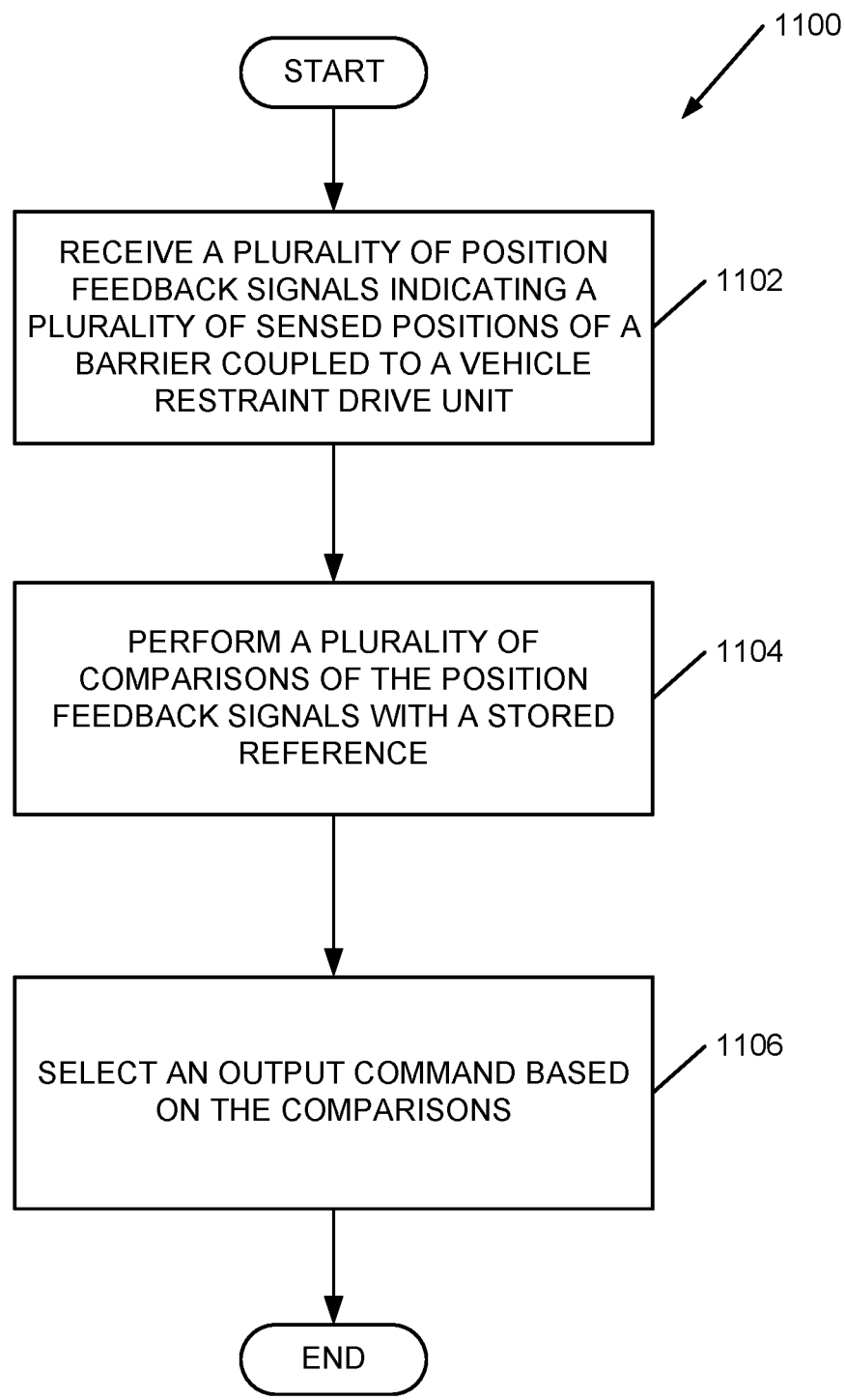
FIG. 11 is a flowchart representative of example machine-readable instructions which may be executed to control movement of the example barrier of FIGS. 1-9 and/or a barrier of the example vehicle restraint of FIG. 10.

The instructions 1100 of FIG. 11 begin when the controller 20 receives a plurality of position feedback signals from the sensor 22 (block 1102). In some examples, the position feedback signals indicate a plurality of sensed positions of the barrier 12 coupled to the vehicle restraint drive unit 40. In some examples, the sensed positions are positions which occur along a plurality of intermediate positions between a fully extended position and a fully retracted position. In some examples, the intermediate positions extend completely and continuously from the fully extended position to the fully retracted position. In other examples, the fully extended position and the fully retracted position define a full travel range from the fully extended position to the fully retracted position, and the intermediate positions extend over a truncated range between the fully extended position and the fully retracted position. Thus, in some examples, the truncated range is less than the full travel range.

In the illustrated example, the example controller 20 performs a plurality of comparisons of the position feedback signals with a stored reference (block 1104). The controller 20 of the illustrated example selects an output signal based on the comparisons (block 1106). In the illustrated example, the output signal is transmitted to the vehicle restraint drive unit 40 as a command such as, for example, a command to stop, a command to move, a command to decelerate, a command to accelerate and/or a command to perform one or more additional and/or alternative actions.

Figure 12:
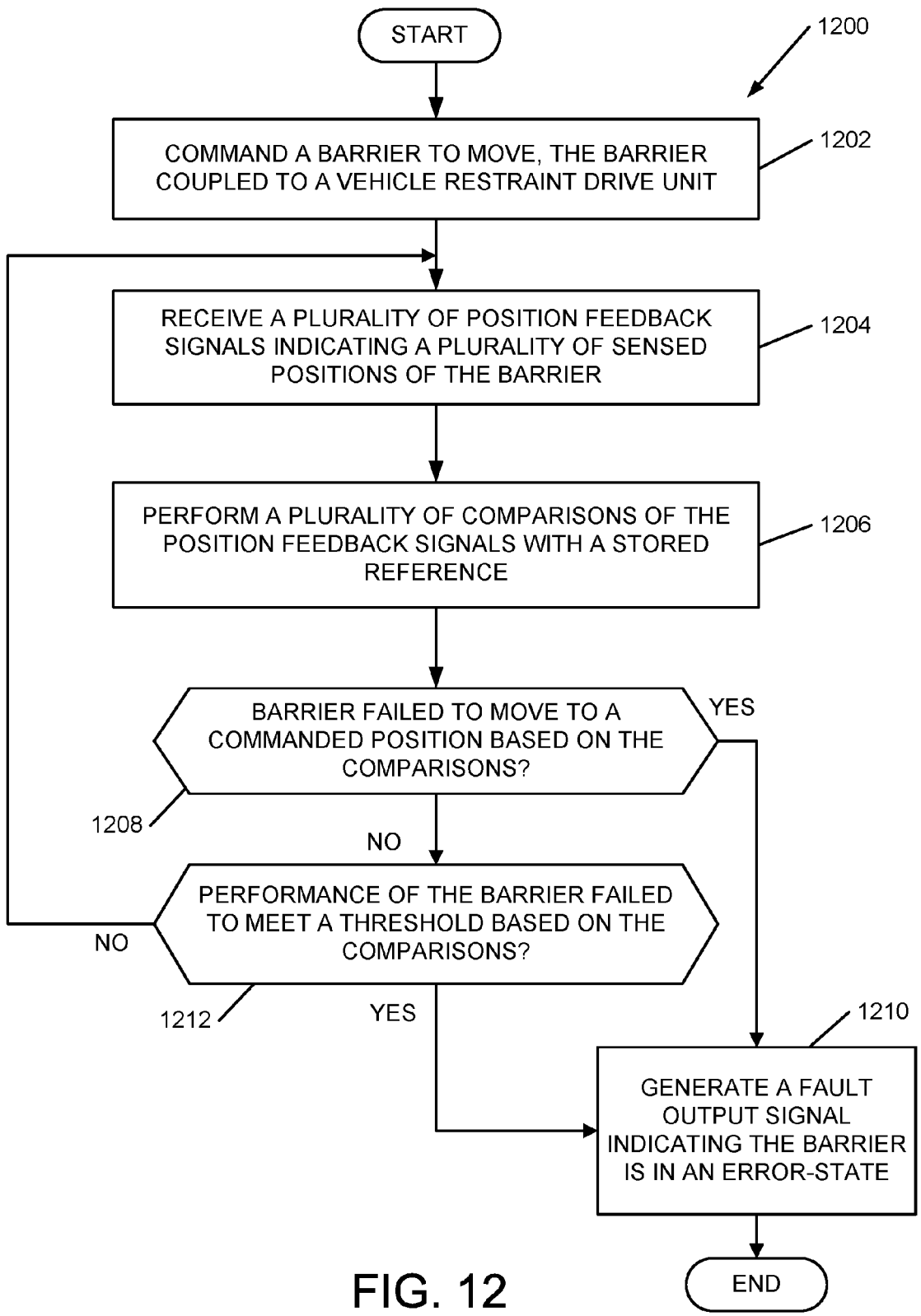
FIG. 12 is a flowchart representative of example machine-readable instructions which may be executed to generate a fault signal indicating the example barrier of FIGS. 1-9 and/or the example barrier of FIG. 10 is in an error-state.

During operation of the barrier 12 such as, for example, discussed in conjunction with FIG. 11, the example instructions 1200 of FIG. 12 may be executed by the controller 20 to determine if the barrier 12 is in an error state and to generate a fault signal if the barrier 12 is in the error state. In some examples, the controller 20 determines that the barrier 12 is in the error state if the controller 12 detects a problem or a fault event associated with the barrier 12 such as, for example, the barrier 12 failing to move as commanded. In some examples, the fault signal indicates to personnel at the dock 18 that the barrier 12 is in the error state. For example, the fault signal may generate an alarm, a light, a message, a sound and/or one or more additional and/or alternative indications that the barrier 12 is in the error state.

The instructions 1200 of FIG. 12 begin when the controller 20 commands the barrier 12 to move (block 1202). In the illustrated example, the controller 20 receives a plurality of position feedback signals from the sensor 22 indicating a plurality of sensed positions of the barrier 12 (block 1204). The controller 20 performs a plurality of comparisons of the position feedback signals with one or more stored reference(s) (block 1206).

In some examples, based on the comparisons, the controller 20 determines if the barrier 12 is in an error state by detecting a problem or fault event associated with the barrier 12 such as, for example, the barrier 12 failing to move as commanded, the barrier 12 failing to meet a threshold level of performance (e.g., a decline in performance of the barrier 12 below a threshold level), and/or other problems and/or fault events. For example, in the illustrated example, the controller 20 determines if the barrier 12 failed to move to a commanded position based on the comparisons (block 1208). For example, if the controller 20 of the illustrated example commands the drive unit 40 to move the barrier 12 to a fully retracted position, and the controller 20 receives position feedback signals indicative of the barrier 12 not being in the fully retracted position, the barrier 12 is in the error state. Thus, if the controller 20 of the illustrated example determines that the barrier 12 failed to move to the commanded position, the controller 20 generates a fault output signal indicating the barrier 12 is in the error state (block 1210).

In the illustrated example, if the controller 20 determines that the barrier 12 moved to the commanded position, the controller 20 determines if a performance of the barrier 12 fails to meet one or more threshold(s) based on the comparisons (block (1212). In some examples, the threshold(s) are one or more stored reference(s) such as, for example, a threshold speed, a threshold rate of acceleration, and/or one or more additional and/or alternative stored references indicative of the performance of the barrier 12. In some examples, the controller 20 determines a value indicative of the performance of the barrier 12 such as a speed, a rate of acceleration, and/or one or more additional and/or alternative values based on the position feedback signals, and the controller 20 compares the value to one or more stored reference value(s) (e.g., a maximum and/or a minimum). If the controller 20 determines that the value is, for example, less than a first stored reference, greater than a second stored reference, etc., the controller 20 determines that the performance of the barrier 12 falls outside the performance level defined by the threshold(s)/reference value(s). In some examples, the controller 20 determined whether the performance falls within a range defined by first and second threshold/reference values (e.g., above the first reference value and below the second reference value).

If the controller 20 determines that the performance of the barrier has not failed to meet the threshold, the example instructions 1200 continue at block 1204. If the controller 20 determines that the performance of the barrier 12 has failed to meet the threshold, the controller 20 generates a fault signal indicating the barrier 12 is in the error state (block 1210).

Figure 13:
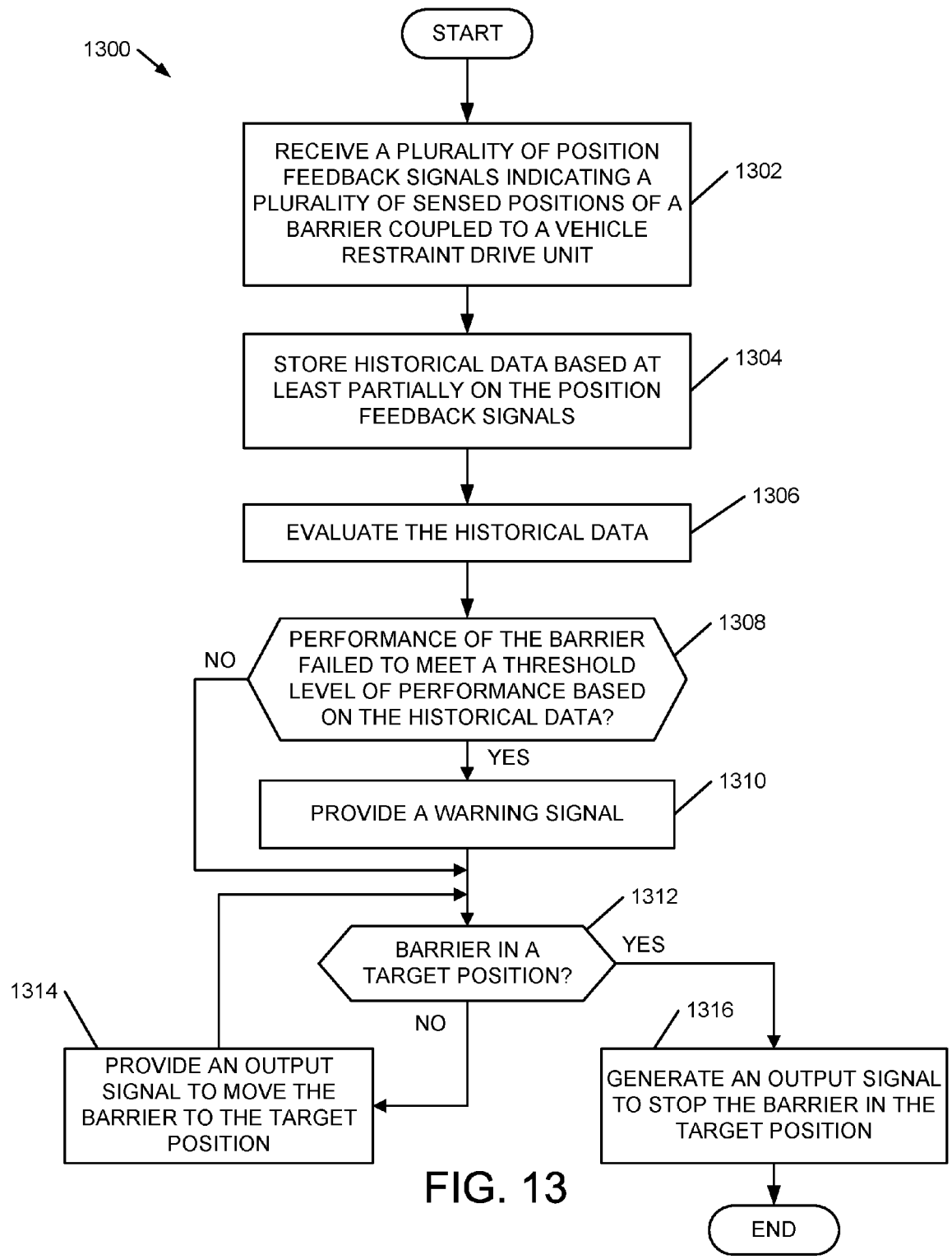
FIG. 13 is a flowchart representative of example machine-readable instructions which may be executed to control the example barrier of FIGS. 1-9 and/or the example barrier of FIG. 10 based on historical data.

The example instructions 1300 of FIG. 13 may be executed by the controller 20 to collect historical data related to the barrier 12 and control the barrier 12 based on the historical data. Examples of historical data include previous positions of the barrier 12, previous speeds of the barrier 12, time(s) of operation of the barrier 12, previous rates of acceleration of the barrier 12, previous rates of deceleration of the barrier 12, and/or additional and/or alternative information. In some examples, the controller 20 evaluates the historical data to determine if a performance of the barrier 12 is degrading, if the barrier 12 is to be moved, and/or if one or more additional and/or alternative actions are to be taken.

The instructions 1300 of FIG. 13 begin by the controller 20 receiving a plurality of position feedback signals indicating a plurality of sensed positions of the barrier 12 (block 1302). In some examples, the controller 20 receives the plurality of position feedback signals when the barrier 12 is moving to a commanded position, when the barrier 12 is in a blocking position, when the vehicle 16 shifts back and forth and moves the barrier 12, which may occur during loading or unloading of the vehicle 16, and/or at different and/or alternative times. In the illustrated example, the controller 20 stores historical data that is based at least partially on the position feedback signals (1304). For example, the controller 20 of the illustrated example stores positions of the barrier 12 when the barrier 12 is moving between a fully retracted position and a fully extended position, when the barrier 12 is positioned (e.g., extended) to block the vehicle 16, and/or at different or alternative times.

The controller 20 evaluates the historical data (block 1306). In some examples, the controller 20 evaluates the historical data by deriving one or more statistical values based on the historical data. Examples of derived statistical values include, but are not limited to, number of daily operating cycles, average blocking position, average blocking position range(s), average barrier speed, peak speed of barrier 12, degradation of average barrier speed, average rate of acceleration of the barrier 12, degradation of an average rate of acceleration of the barrier 12, number of fault events, number of operating hours, a calculated value indicating whether the performance of barrier 12 or vehicle restraint 10 has failed to meet a threshold performance level (e.g., met a threshold level of degradation), etc. In some examples, the controller 20 also evaluates the position feedback signals to determine a status of the barrier 12 such as, for example, a position of the barrier 12, a speed of the barrier 12, a rate of acceleration of the barrier 12 and/or additional and/or alternative statuses. In some examples, the controller 20 performs a plurality of comparisons of the position feedback signals and/or the status(es) with the historical data and/or the statistical value derived from the historical data.

In the illustrated example, the controller 20 determines whether performance of the barrier 12 failed to meet the threshold level of performance (e.g., the performance of the barrier 12 declined to a threshold level of degradation) based on the historical data (block 1308). For instance, the controller 20 of the illustrated example determines whether the performance of the barrier 12 failed to meet the threshold level of performance by comparing the position feedback signals and/or the status(es) of the barrier 12 with one or more of the derived statistical values such as, for example, average barrier speed, average rate of acceleration of the barrier 12, a number of fault events, and/or one or more different and/or alternative derived statistical values.

The controller 20 of the illustrated example generates an output signal based on the historical data. In particular, the controller 20 of the illustrated example provides a warning signal if the controller 20 determines that the performance of the barrier 12 failed to meet the threshold level of performance (block 1310). Once the controller 20 provides the warning signal (block 1310) or if the controller 20 determines that the performance of the barrier 12 did not fail a threshold level of degradation comparison (block 1308), the controller 20 determines if the barrier 12 is in a target position (block 1312). For example, the barrier 12 may not be in the target position if the barrier 12 is moving towards or away from the target position or positioned away from the target position. In some examples, shifting of the vehicle 16 back and forth during loading and/or unloading moves the barrier 12 away from the target position. In some examples, the target position is based on the historical data. For example, the target position may be an average blocking position derived from the historical data collected when the vehicle 16 shifted back and forth during loading and/or unloading.

If the barrier 12 is not in the target position, the controller 20 of the illustrated example provides an output signal to move the barrier 12 to the target position (block 1314). In some examples, the output is transmitted to the vehicle restraint drive unit 40 as a command to move, accelerate, decelerate, and/or perform one or more additional and/or alternative actions. Control then returns to block 1312, and the controller 20 determines if the barrier is in the target position. If the controller 20 of the illustrated example determines that the barrier 12 is in the target position, the controller 20 generates an output signal to stop the barrier 12 in the target position (block 1316).

Figure 14:
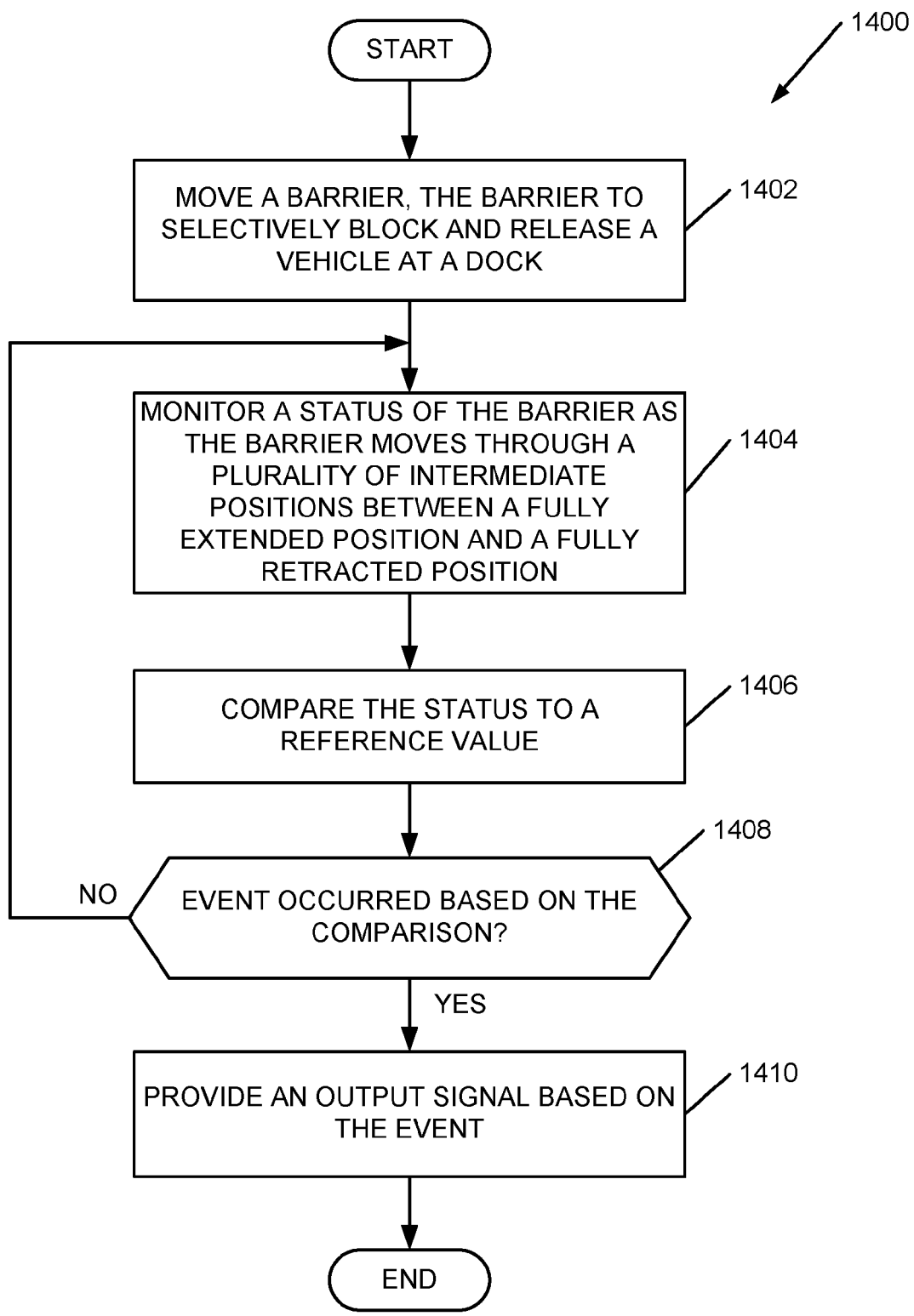
FIG. 14 is a flowchart representative of example machine-readable instructions which may be executed to control operation of the example barrier of FIGS. 1-9 and/or the example barrier of FIG. 10 in response to an occurrence of an event.

The example instructions 1400 of FIG. 14 may be executed by the controller 20 to control the barrier 12 based on additional and/or alternative information than the information used by controller 20 as described in conjunction with FIG. 13. For example, the example instructions 1400 of FIG. 14 may be executed to determine if an event related to the barrier 12 has occurred and to respond to the event 12 by providing an output to, for example, move the barrier 12, provide a warning, and/or perform one or more additional and/or alternative actions. Example events include the barrier 12 moving above or below a threshold speed, the barrier 12 having a speed of substantially zero, the barrier 12 being moved by the vehicle 16, the barrier 12 reaching the fully extended position, the barrier 12 stopping short of the fully extended position, the barrier 12 approaching the fully extended position or the fully retracted position, and/or additional and/or alternative events. In response to determining that an event has occurred, the controller 20 provides an output. For example, the controller 20 may output a signal to accelerate the barrier 12, decelerate the barrier 12, deactivate the barrier 12, move the barrier to a target position, operate the barrier 12 in one of a first or second mode, provide a fault signal, and/or perform one or more additional and/or alternative actions based on the event.

The example instructions 1400 of FIG. 14 begin when the controller 20 moves the barrier 12 (block 1402). In some examples, the controller 20 commands the drive unit 40 to move the barrier 12 through a plurality of intermediate positions, toward a fully extended position and/or toward a fully retracted position. In some examples, shifting of the vehicle 16 during loading and/or unloading moves the barrier 12. In the illustrated example, the sensor 22 monitors a status of the barrier 12 as the barrier 12 moves through the plurality of intermediate positions between the fully extended position and the fully retracted position (block 1404). In some examples, the sensor 22 monitors the status of the barrier 12 substantially continuously while the barrier 12 moves through the plurality of intermediate positions. In some examples, the status is a position of the barrier 12, a speed of the barrier 12, a rate of acceleration of the barrier 12 and/or additional and/or alternative status(es). In some examples, the controller 20 determines the status based at least partially on a plurality of position feedback signals provided by the sensor 22. In some examples, the controller 20 collects historical data of the status.

The controller 20 of the illustrated example compares the status to a reference value (block 1406). For example, in some examples, the controller 20 compares a position of the barrier 12 to a target position of the barrier 12 such as, for example, a fully extended position, an average blocking position and/or one or more additional and/or alternative target positions. In some examples, the controller 20 compares a speed of the barrier 12 to an average speed of the barrier 12. In other examples, the controller 20 compares one or more additional and/or alternative status(es) to the reference values and/or to one or more additional and/or alternative reference values.

The controller 20 of the illustrated example determines if an event has occurred based on the comparison (block 1408). In some examples, the controller 20 determines if the event has occurred exclusive of the fully extended position and the fully retracted position. In some examples, the event is the barrier 12 being at a target position or not being at the target position. For example, if the controller 20 commands the barrier 12 to move to the fully extended position and the barrier 12 stops short of the fully extended position, the controller 20 determines that an event has occurred such as, for example, the barrier 12 contacting the plate 94 of the vehicle 16 that prevents the tip of the barrier 12 from extending over the bar 14 of the vehicle. In some examples, if the controller 20 commands the barrier 12 to move to the fully extended position and the barrier 12 reaches the fully extended position, the controller 20 determines that an event has occurred such as, for example, the tip of the barrier 12 extending over the bar 14 of the vehicle 16.

In some examples, if the controller 20 determines that the barrier 12 moved away from a target position without being commanded to move by the controller 20, the controller 20 determines that an event has occurred such as, for example, shifting of the vehicle 16 during loading and/or unloading. In some examples, the event is the barrier 12 moving at a given speed. For example, if the controller 20 determines that the speed of the barrier 12 is substantially zero, the controller 20 determines that an event has occurred such as, for example, the barrier 12 failing to move. If an event has not occurred, control return to block 1404.

If the controller 20 determines that an event has occurred, the controller 20 provides an output signal based on the event (block 1410). For example, the controller 20 may provide a command to move the barrier 12 to a target position, accelerate the barrier, decelerate the barrier, stop movement of the barrier 12 and/or perform one or more additional and/or alternative actions based on the event. In some examples, the controller 20 provides a fault signal based on the event. For example, if the controller 20 of the illustrated example determines that the performance of the barrier 12 failed to satisfy a threshold level of performance (e.g., fell below a threshold level of degradation), the example controller provides a fault signal to, for example, flash a light, activate an alarm, and/or perform one or more additional and/or alternative actions.

In some examples, the controller 20 deactivates the vehicle restraint drive unit 40 based on the event. For example, the controller 20 of the illustrated example deactivates the vehicle restraint drive unit 40 when the barrier 12 is being commanded to move and the speed of the barrier 12 is substantially zero. In some examples, the controller 20 provides a command to stop driving or deactivate the vehicle restraint drive unit 40 if the barrier 12 is commanded to move to a target position (e.g., the fully extended position) and the barrier 12 stops short of the target position.

In some examples, the controller 20 activates the vehicle restraint drive unit 40 in response to the event occurring while the vehicle restraint drive unit 40 is deactivated. For example, if the controller 20 determines that the vehicle 16 moves the barrier 12 while the vehicle restraint drive unit 40 is deactivated, the controller 20 activates the vehicle restraint drive unit 40 and commands the vehicle restraint drive unit 40 to move the barrier 12 to a target position such as, for example, an average blocking position.

Figure 15:
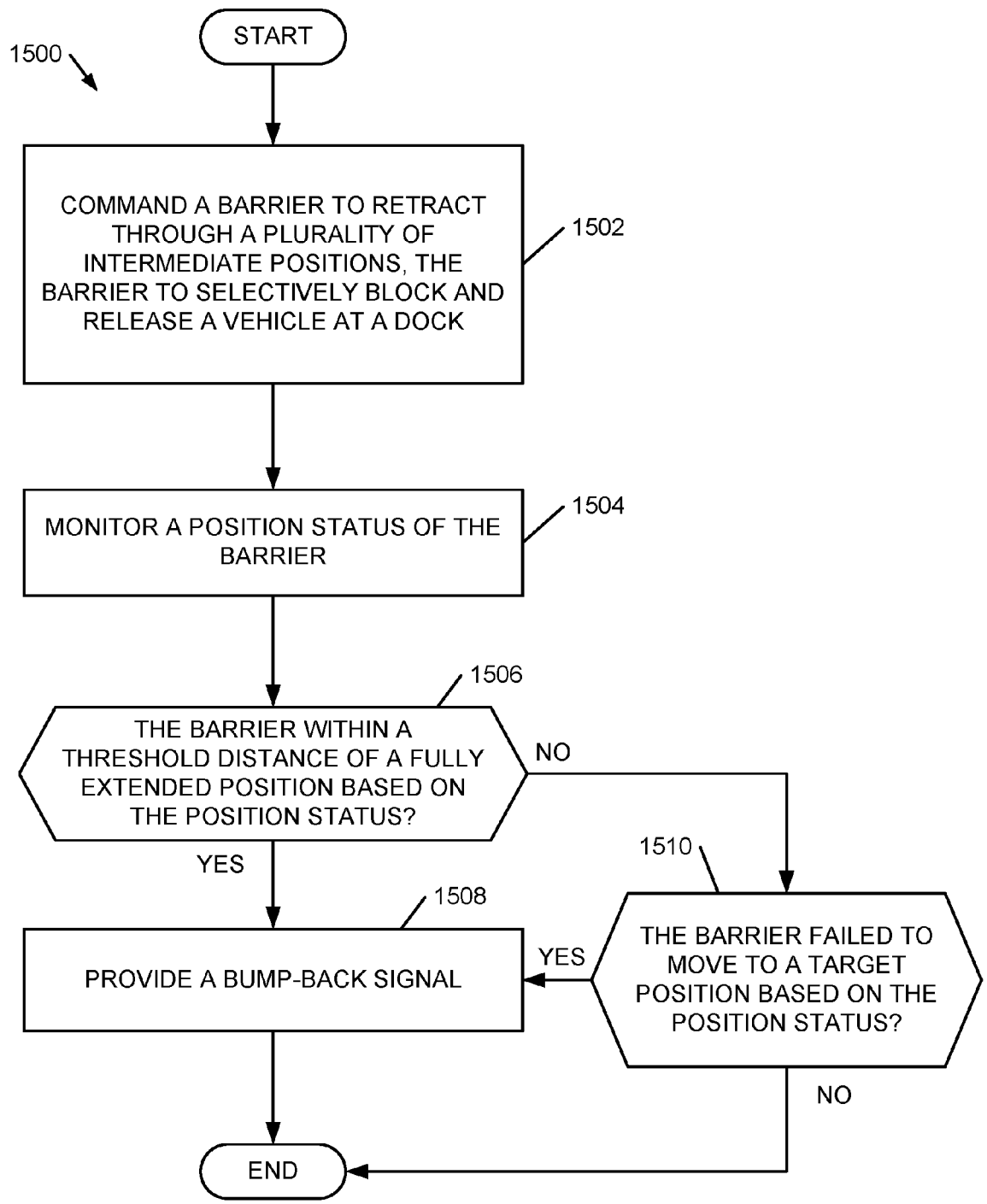
FIG. 15 is a flowchart representative of example machine-readable instructions which may be executed to provide a bump-back signal to a driver of a vehicle based on a position status of the example barrier of FIGS. 1-9 and/or the example barrier of FIG. 10.

FIG. 15 illustrates other example instructions that may be executed by the controller 20 to operate the barrier 12. The example instructions 1500 of FIG. 15 may be executed by the controller 20 to signal a driver of the vehicle 16 to adjust a position of the vehicle 16 if the position of the vehicle 16 is preventing the barrier 12 from retracting. In some examples, the bar 14 of the vehicle 16 may exert a jamming pressure against the barrier 12 that prevents the barrier 12 from retracting when the controller 20 commands the drive unit 40 to move the barrier 12 toward the fully retracted position. In some such examples, if the vehicle 16 moves toward the dockface 26, the vehicle 16 relieves the jamming pressure and enables the barrier 12 to retract. The example instructions 1500 of FIG. 15 may be executed by the controller 20 to determine if the position of the vehicle 16 is preventing the barrier 12 from retracting and to provide a bump-back signal to the driver of the vehicle 16 indicating that the driver is to bump-back or move the vehicle toward the dockface 26.

The instructions 1500 of FIG. 15 begin when the controller 20 commands the barrier 12 to retract through a plurality of intermediate positions (block 1502). The sensor 22 of the illustrated example monitors a position status of the barrier 12 (block 1504). In some examples, the sensor 22 continuously or substantially continuously monitors (e.g., monitors at very short intervals such as once per second or less) the position status of the barrier 12. In some examples, the controller 20 collects and evaluates historical data based on the position status of the barrier 12.

In the illustrated example, the controller 20 determines if the barrier 12 is within a threshold distance of a fully extended position based on the position status of the barrier 12 (block 1506). In some examples, the controller 20 determines if the barrier 12 is within the threshold distance by determining if the barrier 12 is within a threshold range of positions. If the barrier 12 is within the threshold distance of the fully extended position, the controller 20 provides a bump-back signal (block 1508). In some examples, the threshold distance is determined based on the historical data. If the barrier 12 is not within the threshold distance of the fully extended position (e.g., the barrier 12 retracted beyond the threshold distance), the controller 20 of the illustrated example determines if the barrier 12 failed to move to a target position based on the position status (block 1510). In the illustrated example, if the barrier 12 failed to move to the target position, the controller 20 provides the bump-back signal. Once the controller 20 provides the bump-back signal (block 1508)) or if the barrier 12 moved to the target position (block 1510), the example instructions 1500 of FIG. 15 end.

Figure 16:
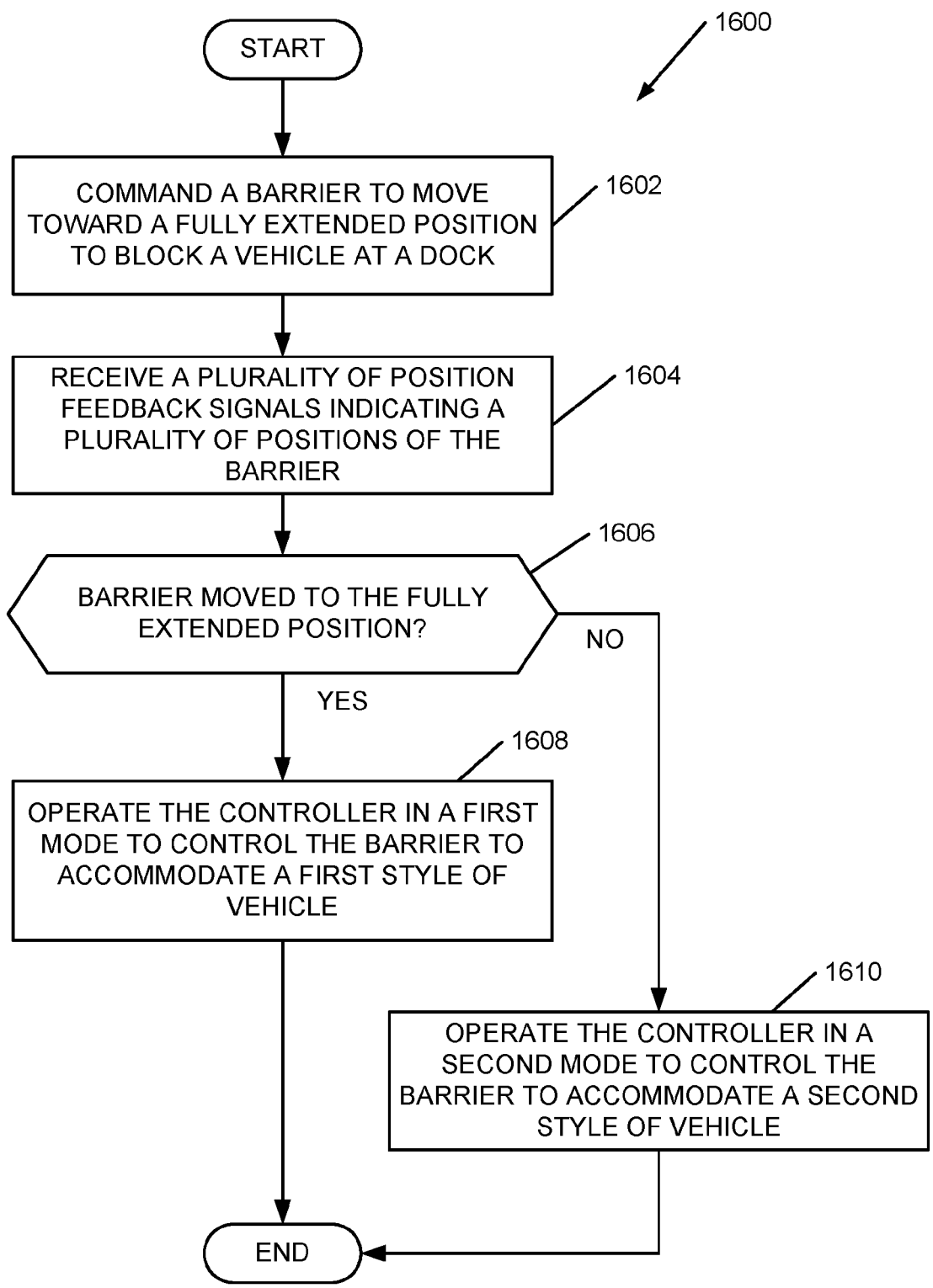
FIG. 16 is a flowchart representative of example machine-readable instructions which may be executed to control the example barrier of FIGS. 1-9 in a selected one of a plurality of modes based on a style of the vehicle being restrained.

The example instructions 1600 of FIG. 16 may be executed by the controller 20 to control the barrier 12 in one of a plurality of modes to accommodate vehicles of different styles. Although the controller 20 is described in the following examples as operating in one of two modes, other examples employ other numbers of modes (e.g., 3, 4, 5, 6, etc.). In the illustrated example, each of the modes is associated with a respective one of the styles. In the illustrated example, a first style of vehicle includes a bar (e.g., the bar 14 of FIG. 8) that permits a tip of the barrier 12 to move over the bar. An example second style of vehicle includes a plate 84 (FIG. 9) or other structure that prevents or obstructs the tip of the barrier 12 from extending over a bar. In the illustrated example, the controller 20 in the first mode defines a first blocking range to accommodate the first style of vehicle. For example, when the barrier 12 is positioned within the first blocking range, a tip of the barrier 12 is to extend back over the bar 14 as shown, for example, in FIG. 8. In some examples, in the first mode the controller 20 generates fault signals based on the position of the barrier 12 relative to the first blocking range. For example, in some such examples, in the first mode the controller 20 generates a fault signal if the barrier 12 is to block the vehicle 16 but is positioned outside the first blocking range.

In the second mode, the controller 20 of the illustrated example accommodates the second type of vehicle by defining and/or employing a second blocking range different than the first blocking range. For example, the second blocking range may be narrower than the first blocking range (e.g., the second blocking range may not include the fully extended position) and/or include different positions because the tip of the barrier 12 is to contact and/or be positioned adjacent the plate 84 to block a vehicle of the second style and cannot extend back over the bar 14. In some examples, the controller 20 in the second mode generates fault signals based on the position of the barrier 12 relative to the second blocking range. For example, in some such examples, the controller 20 does not generate a fault signal in the second mode if the barrier 12 is in the second blocking range even though the barrier 12 may be outside of the first blocking range.

The example instructions 1600 of FIG. 16 begin when the example controller 20 commands the barrier 12 to move toward a fully extended position to block a vehicle at the dock 18 (block 1602). The controller 20 receives a plurality of position feedback signals from the sensor 22 indicating a plurality of positions of the barrier 12 (block 1604). The controller 20 determines if the barrier 12 moved to the fully extended position based on the position feedback signals (block 1606).

In some examples, the controller 20 automatically (i.e., without human input) determines if the controller 20 is to operate in the first mode associated with the first vehicle style or the second mode associated with the second vehicle style based on the position feedback signals. For example, in the illustrated example, if the barrier 12 moves to the fully extended position (i.e., a position in which the tip of the barrier 12 is over the bar 14), the controller 20 operates in the first mode to accommodate the first style of vehicle (block 1608). In some examples in which the sensor 22 includes a video camera with analytics, the controller 20 automatically determines if the controller 20 is to operate in the first mode or the second mode based on one or more images of the vehicle 16 captured by the video camera. For example, the controller 20 may compare the images to one or more stored reference images to determine if the vehicle 16 is the first vehicle style or the second vehicle style. In other examples, the controller 20 analyzes the images in other ways to determine if the vehicle 16 is the first vehicle style or the second vehicle style. If the example controller 20 determines that the vehicle 16 is the first vehicle style, the controller 20 operates in the first mode.

In some examples in which the second style of vehicle is located at the dock 18, the barrier 12 contacts the plate 84 (FIG. 9) or other structure of the vehicle 16, which prevents the tip of the barrier 12 from extending over the bar 14 and moving to the fully extended position. Thus, in the illustrated example, if the controller 20 determines that the barrier 12 did not move to the fully extended position (e.g., the barrier 12 stopped in a position short of the fully extended position), the controller 20 operates in the second mode to accommodate the second style of vehicle (block 1610). In some examples in which the sensor 22 includes the video camera with analytics, the controller 20 detects a presence of the plate 84 based on one or more of the images of the vehicle 16 captured by the camera. If the controller 20, for example, detects the presence of the plate 84, the example controller 20 operates in the second mode to accommodate the second vehicle style.

Figure 17:
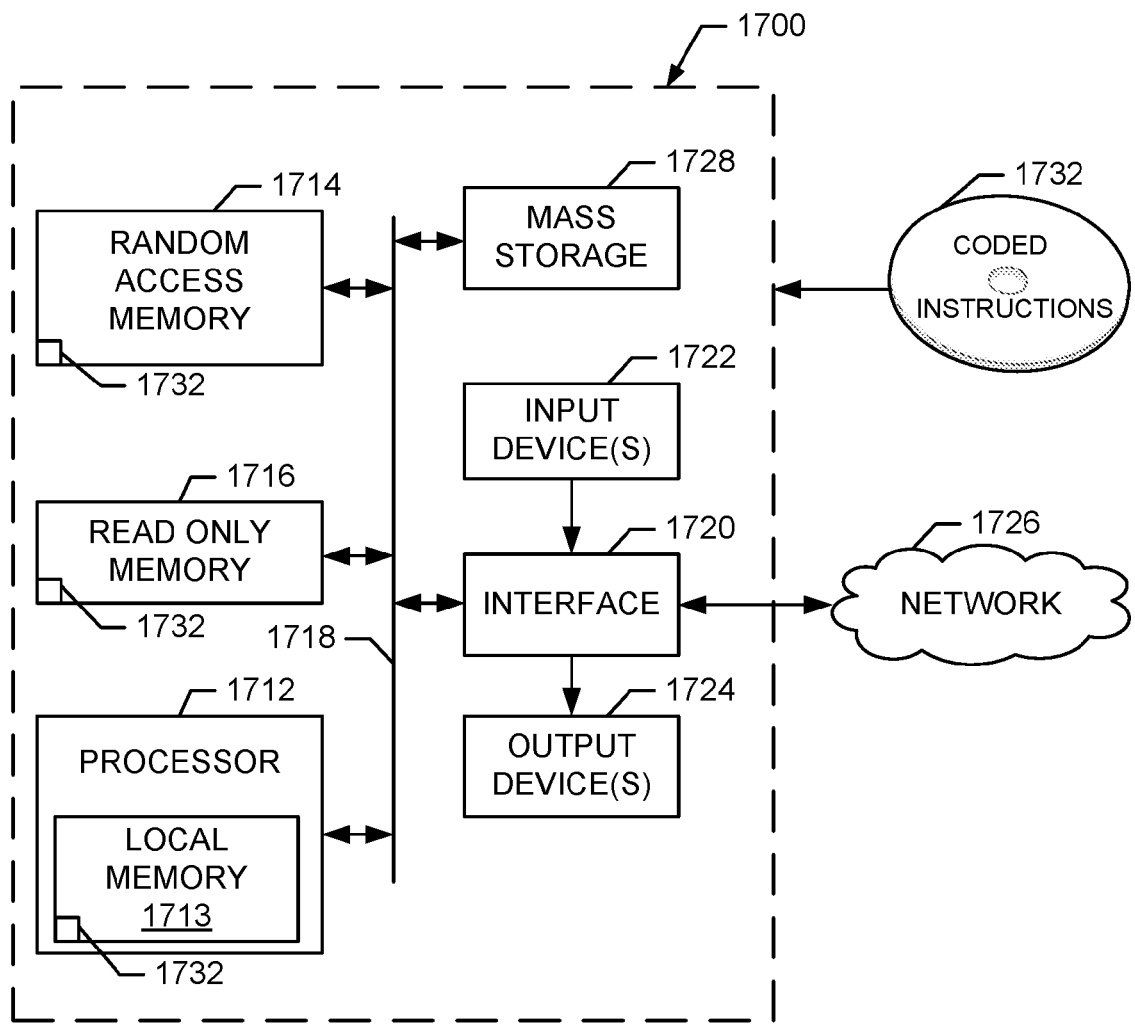
FIG. 17 illustrates an example processor platform that may execute any of the instructions of FIGS. 11-16 to control the example barrier of FIGS. 1-9 and/or the example barrier of FIG. 10.

FIG. 17 is a block diagram of an example processor platform 1700 capable of executing the instructions of FIGS. 11-16 to implement the example controller 20 of FIGS. 1-10. The processor platform 1700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors or controllers from any desired family or manufacturer.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit 1720 may be implemented by any type of interface standard, such as an Ethernet interface, a universal serial bus (USB), and/or a PCI express interface.

In the illustrated example, one or more input devices 1722 are connected to the interface circuit 1720. The input device(s) 1722 permit(s) a user to enter data and commands into the processor 1712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1720 of the illustrated example, thus, typically includes a graphics driver card, a graphics driver chip or a graphics driver processor.

The interface circuit 1720 of the illustrated example also includes a communication device such as a transmitter, a receiver, a transceiver, a modem and/or network interface card to facilitate exchange of data with external machines (e.g., computing devices of any kind) via a network 1726 (e.g., an Ethernet connection, a digital subscriber line (DSL), a telephone line, coaxial cable, a cellular telephone system, etc.).

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, RAID systems, and digital versatile disk (DVD) drives.

The coded instructions 1732 of FIGS. 17 may be stored in the mass storage device 1728, in the volatile memory 1714, in the non-volatile memory 1716, and/or on a removable tangible computer readable storage medium such as a CD or DVD.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A method to selectively block and release a vehicle at a dock, the method comprising:
moving a barrier, via a vehicle restraint drive unit, relative to a main body proximate the dock between a fully extended position to block the vehicle, a fully retracted position to release the vehicle, and a plurality of intermediate positions between the fully extended position and the fully retracted position, the barrier to provide a more prominent obstruction to the vehicle when the barrier is in the fully extended position than when the barrier is in the fully retracted position;

monitoring a status of the barrier as the barrier moves through the plurality of intermediate positions;

comparing the status to a reference value;

determining that an event has occurred based on the comparison of the status and the reference value;

providing an output in response to determining that the event has occurred;

commanding the barrier to retract through the intermediate positions; and providing a bump-back signal in response the barrier failing to move to the fully retracted position, the bump-back signal to provide notification to a driver of a vehicle to move the vehicle toward a wall of a loading dock when the barrier is engaged with the vehicle.

2. The method of claim 1, further including providing the bump-back signal in response to the barrier being within a threshold distance of the fully extended position.

3. The method of claim 1, wherein providing the output includes generating a fault signal if the barrier failed to move to the fully retracted position.

4. The method of claim 1, wherein the monitoring of the status includes monitoring a position status of the barrier.

5. The method of claim 4, further including collecting and evaluating historical data based on the position status of the barrier.

6. The method of claim 1, wherein the determining of the event includes determining if the barrier failed to move to a target position.

7. The method of claim 6, wherein providing the output includes generating a fault signal if the barrier failed to move to the target position.

8. The method of claim 7, further including determining if the barrier is within a threshold distance of the fully extended position when a controller receives a command to drive the barrier to the target position.

9. The method of claim 1, wherein the monitoring of the status includes detecting a speed of the barrier.

10. The method of claim of claim 9, wherein the determining that the event has occurred includes determining whether a detected speed of the barrier satisfies a threshold speed.

11. The method of claim 1, wherein the monitoring of the status of the barrier is performed substantially continuously while the barrier moves through the plurality of intermediate positions.

12. The method of claim 1, wherein the determining that the event has occurred is determined when the barrier is in the plurality of intermediate positions, and wherein the determining of the occurrence of the event does not occur when the barrier is the fully extended position and the fully retracted position.

13. The method of claim 1, wherein the moving of the barrier through the plurality of intermediate positions occurs via the vehicle moving relative to the dock.

14. The method of claim 1, wherein moving the barrier through the intermediate positions includes moving the barrier via a vehicle restraint drive unit that is operatively coupled to the barrier.

15. The method of claim 14, further including activating the vehicle restraint drive unit in response to determining that the event has occurred somewhere along the intermediate positions.

16. The method of claim 14, wherein determining the event further includes determining a speed of the barrier is substantially zero, and providing the output includes commanding deactivation of the vehicle restraint drive unit in response to determining that the speed of the barrier is substantially zero.

17. The method of claim 14, wherein monitoring the status further includes monitoring at least one of a speed of the barrier, a position of the barrier, or an acceleration of the barrier, and comparing the status to the reference includes determining at least one of a change in barrier speed, a change in barrier position and a change in barrier acceleration; the method further including:

determining whether the vehicle restraint drive unit is deactivated;

determining whether the event occurred while the vehicle restraint drive unit was deactivated; and providing the output in response to determining that the event has occurred while the vehicle restraint drive unit was deactivated.

18. A method of using a barrier to selectively block and release a vehicle at a dock, the barrier being selectively movable to a fully extended position, a fully retracted position, and a plurality of intermediate positions between the fully extended position and the fully retracted position, the barrier being under command of a controller that uses a sensor to monitor a position status of the barrier, the method comprising:

commanding the barrier to retract through a plurality of intermediate positions;

monitoring the position status of the barrier, via the sensor; and providing a bump-back signal in response to the barrier failing to move to the fully retracted position, the bump-back signal to provide notification to a driver of a vehicle to move the vehicle away from the barrier.

19. The method of claim 18, further comprising collecting historical data based on the position status of the barrier.

20. The method of claim 19, further comprising collecting and evaluating historical data based on the position status of the barrier.

21. A tangible computer-readable medium comprising instructions that, when executed, cause a machine to:

move a barrier via a vehicle restraint drive unit relative to a main body proximate a dock between a fully extended position to block a vehicle, a fully retracted position to release the vehicle, and a plurality of intermediate positions between the fully extended position and the fully retracted position, the barrier to provide a more prominent obstruction to the vehicle when the barrier is in the fully extended position than when the barrier is in the fully retracted position;

monitor a status of the barrier as the barrier moves through the plurality of intermediate positions;

compare the status to a reference value;

determine that an event has occurred based on the comparison of the status and the reference value;

provide an output in response to determining that the event has occurred;

command the barrier to retract through a plurality of intermediate positions; and provide a bump-back signal in response to the barrier failing to move to the fully retracted position, the bump-back signal to provide notification to a driver of the vehicle to move the vehicle toward a wall of a loading dock when the barrier is engaged with the vehicle.

22. The computer-readable medium as defined in claim 21, comprising instructions that, when executed, cause the machine to:

and provide the bump-back signal in response to
the barrier being within a threshold distance of the fully extended position.

23. The computer-readable medium as defined in claim 21, comprising instructions that, when executed, cause the machine to monitor a position status of the barrier.

24. The computer-readable medium as defined in claim 23, comprising instructions that, when executed, cause the machine to collect historical data based on the position status of the barrier.

25. The computer-readable medium as defined in claim 21, comprising instructions that, when executed, cause the machine to determine if the barrier failed to move to a target position to determine if the event occurred.

26. The computer-readable medium as defined in claim 25, comprising instructions that, when executed, cause the machine to generate a fault signal if the barrier failed to move to the target position.

27. The computer-readable medium as defined in claim 26, comprising instructions that, when executed, cause the machine to determine if the barrier is in a threshold distance of the fully extended position when a controller receives a command to drive the barrier to the target position.

28. The computer-readable medium as defined in claim 21, comprising instructions that, when executed, cause the machine to determine if the barrier is not moving toward the fully retracted position when a controller causes the barrier to move to the retracted position to determine if the event occurred.

29. The computer-readable medium as defined in claim 21, comprising instructions that, when executed, cause the machine to detect a speed of the barrier.

30. The computer-readable medium as defined in claim 29, comprising instructions that, when executed, cause the machine to determine whether the detected speed satisfies a threshold speed.

31. The computer-readable medium as defined in claim 21, comprising instructions that, when executed, cause the machine to continuously monitor the status of the barrier while the barrier moves through the plurality of intermediate positions.

32. The computer-readable medium as defined in claim 21, comprising instructions that, when executed, cause the machine to determine the event when the barrier is in the plurality of intermediate positions.

33. The computer-readable medium as defined in claim 21, comprising instructions that, when executed, cause the machine to determine a speed of the barrier being substantially zero, and command deactivation of the vehicle restraint drive unit in response to determining that the speed of the barrier is substantially zero.

34. The computer-readable medium as defined in claim 33, comprising instructions that, when executed, cause the machine to:

determine whether a vehicle restraint drive unit is deactivated;

determine whether the event occurred while the vehicle restraint drive unit was deactivated; and provide the output in response to determining that the event has occurred while the vehicle restraint drive unit was deactivated.

35. The computer-readable medium as defined in claim 21, comprising instructions that, when executed, cause the machine to monitor at least one of a speed of the barrier, a position of the barrier, or an acceleration of the barrier, and compare the status to the reference to determine at least one of a change in barrier speed, a change in barrier position and a change in barrier acceleration.

\* \* \* \* \*